US012590686B2

(12) United States Patent
Shin et al.

(10) Patent No.: US 12,590,686 B2
(45) Date of Patent: Mar. 31, 2026

(54) LIGHTING SYSTEM

(71) Applicant: SL Corporation, Daegu (KR)

(72) Inventors: Ki Hae Shin, Gyeongsan-si (KR); Jong Woon Kim, Gyeongsan-si (KR); Jong Min Lee, Gyeongsan-si (KR)

(73) Assignee: SL Corporation, Daegu (KR)

(*) Notice: Subject to any disclaimer, the term of this patent is extended or adjusted under 35 U.S.C. 154(b) by 0 days.

(21) Appl. No.: 18/898,545

(22) Filed: Sep. 26, 2024

(65) Prior Publication Data

US 2025/0020302 A1 Jan. 16, 2025

Related U.S. Application Data

(63) Continuation-in-part of application No. PCT/KR2023/003350, filed on Mar. 13, 2023.

(51) Int. Cl.

| | |
|---|---|
| ***F21S 41/675*** | (2018.01) |
| ***F21S 41/148*** | (2018.01) |
| ***F21S 41/153*** | (2018.01) |
| ***F21S 41/32*** | (2018.01) |
| *F21W 102/17* | (2018.01) |

(52) U.S. Cl.

CPC ........... *F21S 41/675* (2018.01); *F21S 41/148* (2018.01); *F21S 41/153* (2018.01); *F21S 41/322* (2018.01); *F21W 2102/17* (2018.01)

(58) Field of Classification Search

CPC . F21W 2102/17; F21W 2103/60; B60Q 1/26; B60Q 1/50; B60Q 2400/50; B60Q 1/00; B60Q 1/2665; F21S 41/675; F21S 41/322; F21S 41/148; F21S 41/153; G02B 26/08; G02B 26/0816; G02B 19/00; G02B 19/0047

See application file for complete search history.

(56) References Cited

U.S. PATENT DOCUMENTS

| | | | | |
|---|---|---|---|---|
| 10,386,043 | B1 | 8/2019 | Lim et al. | |
| 2006/0083014 | A1* | 4/2006 | Kanzler | F21S 41/39 362/475 |
| 2017/0329210 | A1 | 11/2017 | Zawacki | |
| 2018/0009374 | A1 | 1/2018 | Kim et al. | |

FOREIGN PATENT DOCUMENTS

| | | | | |
|---|---|---|---|---|
| JP | 2004503188 | A * | 1/2004 | B60Q 1/085 |
| JP | 2018-192836 | A | 12/2018 | |
| JP | 2021-190292 | A | 12/2021 | |

(Continued)

OTHER PUBLICATIONS

Search English translation of JP 2004503188 A (Year: 2004).*
Search English translation of WO-2020067337-A1 (Year: 2020).*
Search English translation of WO 2019082980 A1 (Year: 2019).*

*Primary Examiner* — Omar Rojas Cadima

(74) *Attorney, Agent, or Firm* — United One Law Group LLC; Kongsik Kim; Jhongwoo Peck

(57) ABSTRACT

A lighting system is capable of forming pattern images at various locations while having a simplified structure. The lighting system includes a lighting device that emits light for forming a pattern image at at least one location; and a control device configured to control a target direction to which the irradiation light is emitted based on at least one of vehicle state information or vehicle surrounding information.

12 Claims, 33 Drawing Sheets

(56) References Cited

FOREIGN PATENT DOCUMENTS

| | | | | |
|---|---|---|---|---|
| KR | 10-2019-0132170 | A | 11/2019 | |
| KR | 10-2021-0104371 | A | 8/2021 | |
| KR | 10-2022-0026403 | A | 3/2022 | |
| WO | WO-2019082980 | A1 * | 5/2019 | ............. B60Q 9/008 |
| WO | WO-2020067337 | A1 * | 4/2020 | ............. G08G 1/166 |
| WO | 2021/177299 | A1 | 9/2021 | |

* cited by examiner (|±α1| > |±α2|)

LIGHTING SYSTEM

CROSS-REFERENCE TO RELATED APPLICATIONS

This application is a Continuation in-part of International Application No. PCT/KR2023/003350 filed Mar. 13, 2023, which claims priority from Korean Application No. 10-2022-0038956 filed Mar. 29, 2022. The aforementioned applications are incorporated herein by reference in their entireties.

TECHNICAL FIELD

The present disclosure relates to a lighting system, and more particularly, to a lighting system capable of forming pattern images at various locations while having a simplified structure.

RELATED ART

A vehicle is provided with various types of lamps having an illumination function for more easily confirming objects located around the vehicle when operating at low-light conditions (e.g., night-time driving) and a signaling function for notifying the drivers of nearby vehicles or pedestrians of a driving state of the vehicle.

For example, a headlamp, a fog lamp, and the like, are mainly intended for the illumination function. On the other hand, a turn signal lamp, a tail lamp, a brake lamp, and the like, are mainly intended for the signaling function. The installation standards and specifications for the respective lamps are stipulated by law so that the respective lamps may sufficiently perform their functions.

However, information that may be conveyed by only the illumination function or the signaling function is limited. Therefore, recently, research on delivering more various information to the surrounding vehicles or the pedestrians by forming a pattern image that conveys desired information on a road surface around the vehicle has been actively conducted.

SUMMARY

Aspects of the present disclosure provide a lighting system that emits light for forming pattern images at different locations around a vehicle while having a simplified structure.

Aspects of the present disclosure also provide a lighting system that allows pattern images to be more uniformly formed even though the pattern images are formed at different locations around a vehicle.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lighting system may include a lighting device that emits light for forming a pattern image on a road surface at at least one location; and a control device configured to control a target direction to which the light is emitted based on at least one of vehicle state information or vehicle surrounding information.

In some embodiments, the lighting device may include a light source unit that generates irradiation light; and a light path adjustment unit that adjusts a light path to allow the generated irradiation light to proceed in the target direction. The light path adjustment unit may include at least one reflective surface to reflect the irradiation light and allow the generated irradiation light to proceed in the target direction.

The target direction may be determined according to a tilting angle of a main axis of the light path adjustment unit, which is normal (e.g., perpendicular) to the at least one reflective surface, with respect to a main axis of the light source unit, which is parallel to a travel direction of the generated irradiation light.

The at least one reflective surface may be tilted in at least one direction with respect to the main axis of the light path adjustment unit to allow the pattern image to have a predetermined size, and the control device may be configured to control a light irradiation angle of the irradiation light by adjusting an angle to which the at least one reflective surface is tilted with respect to the main axis of the light path adjustment unit. In some embodiments, the at least one reflective surface may be tilted repeatedly with a predetermined frequency with respect to the main axis of the light path adjustment unit to allow the pattern image to have the predetermined size.

The control device may be configured to adjust at least one of a light amount or the light irradiation angle of the generated irradiation light depending on a location to which the light is to be emitted by the light path adjustment unit.

The control device may be configured to allow pattern images that are formed at locations having different distances from the lighting device to have a substantially uniform brightness and size by adjusting at least one of the light amount or the light irradiation angle of the generated irradiation light depending on the distances that the irradiation light emitted from the lighting device reaches.

The control device may be configured to decrease the light irradiation angle and/or increase the light amount of the light source unit as the distance for the irradiation light emitted from the lighting device to reach increases.

In some embodiments, the control device may include a detection unit configured to detect at least one of the vehicle state information or the vehicle surrounding information; an input unit to which a detection result by the detection unit is input; and a processing unit configured to adjust at least one of the target direction or one or more attributes of the pattern image based on the detection result input from the detection unit. The attributes of the pattern image may include at least one of size, brightness, or color of the pattern image. The input unit may be configured to receive a control command from a driver associated with at least one of the target direction or the attributes of the pattern image.

The vehicle state information may include at least one of vehicle speed, shift stage, driving direction, or door opening state. The vehicle surrounding information may include at least one of surrounding brightness, road surface state, or weather condition.

The control device may be configured to allow the pattern image to be formed in response to the vehicle being at rest or coming to rest.

The light source unit may include a plurality of light sources that generate light of different colors; and a light synthesis unit that combines the light generated by the plurality of light sources to generate the irradiation light. The plurality of light sources may be arranged in two or more rows. The light synthesis unit may include a first synthesis unit and a second synthesis unit, and each of the first synthesis unit and the second synthesis unit may include a plurality of dichroic mirrors.

In some embodiments, the lighting system may further include a liquid crystal display or a digital light processing (DLP) unit disposed upstream or downstream of the light path adjustment unit to define the pattern image to be projected on the road surface.

Other detailed contents of the present disclosure are described in a detailed description and are illustrated in the drawings.

The lighting system according to the present disclosure as described above has one or more of the following effects.

Since a component for forming pattern images at different locations around a vehicle may be shared, the structure of the lighting system may be simplified. In addition, since the pattern images formed at different locations around the vehicle may have a uniform size and brightness, the visibility may be improved.

The effects of the present disclosure are not limited to the aforementioned effects, and other effects that are not mentioned may be obviously understood by one of ordinary skill in the art from the claims.

DETAILED DESCRIPTION

Figure 1:
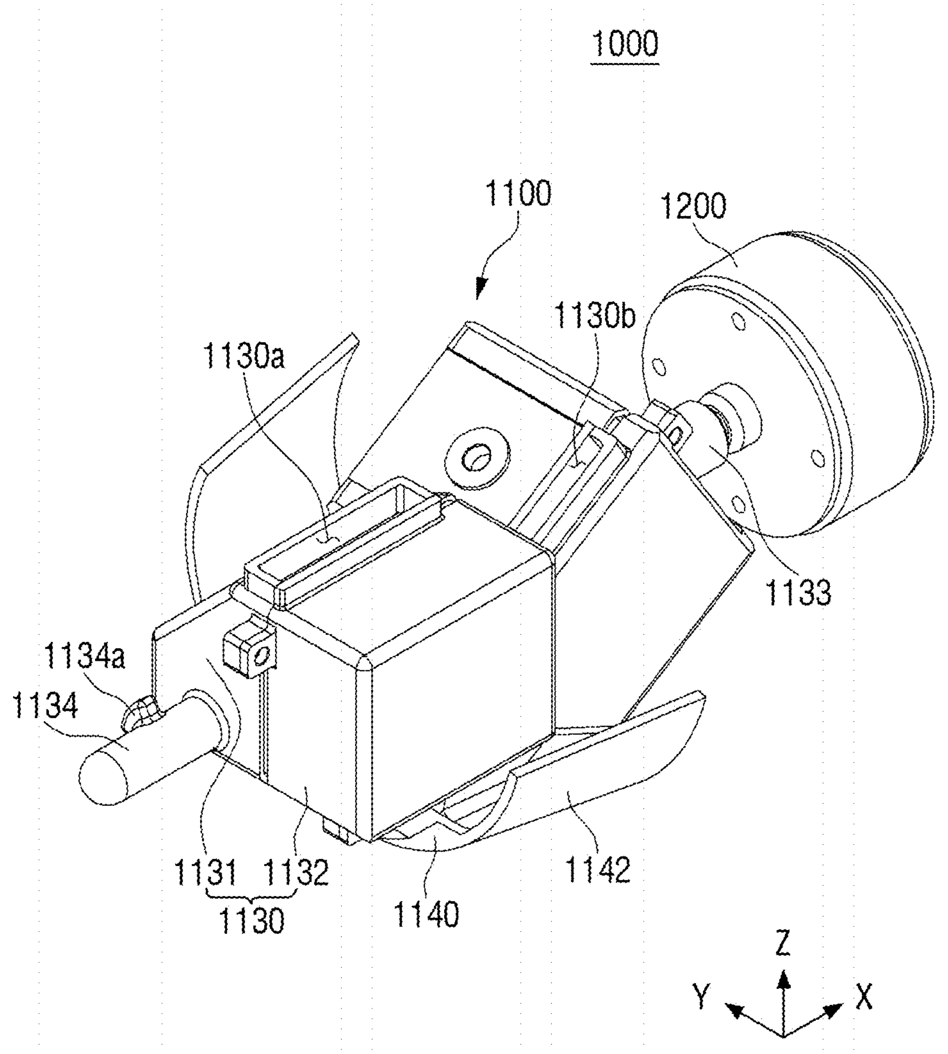
FIGS. 1 to 3 are perspective views illustrating a lighting device according to an embodiment of the present disclosure.

Advantages and features of the present disclosure and methods for accomplishing these advantages and features will become apparent from embodiments to be described later in detail with reference to the accompanying drawings. However, the present disclosure is not limited to the embodiments to be described below, but may be implemented in various different forms, these embodiments will be provided only in order to make the present disclosure more complete and allow one of ordinary skill in the art to which the present disclosure pertains more easily recognize the scope of the present disclosure, and the present disclosure will be defined by the scope of the claims. Throughout the specification, the same components will be denoted by the same reference numerals.

Accordingly, in some embodiments, well-known process steps, well-known structures, and well-known techniques will not be specifically described in order to avoid ambiguity in the interpretation of the present disclosure.

The terms as used herein are for describing the embodiments rather than limiting the present disclosure. In the present specification, a singular form may include a plural form unless stated otherwise in the phrase. The terms "comprise" and/or "comprising" as used herein do not exclude the existence or addition of one or more other components, steps, operations, and/or elements in addition to the mentioned components, steps, operations, and/or elements. In addition, "and/or" includes each and all combinations of one or more of the mentioned items.

Further, embodiments described in the present specification will be described with reference to cross-sectional views and/or schematic views, which are ideal illustrative views of the present disclosure. Accordingly, forms of the illustrative views may be changed due to manufacturing technology, tolerance, and the like. Accordingly, embodiments of the present disclosure are not limited to specific forms illustrated in the drawings, and also include changes in forms generated according to manufacturing processes. In addition, the respective components in the respective drawings illustrated in the present disclosure may be illustrated in an enlarged or reduced form to some extent for convenience of explanation. Throughout the specification, the same components will be denoted by the same reference numerals.

Hereinafter, the present disclosure will be described with reference to the drawings for describing a lighting device according to embodiments of the present disclosure.

Figure 2:
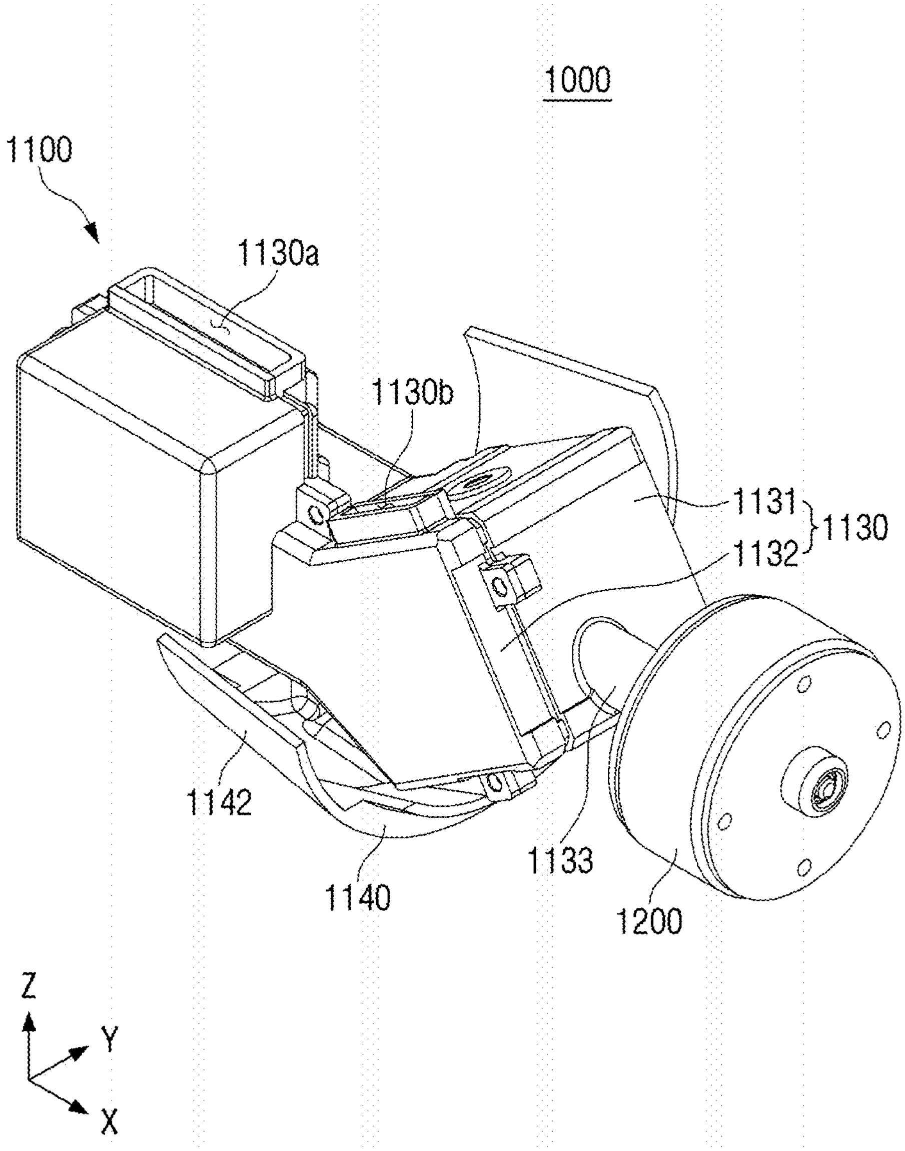
Figure 3:
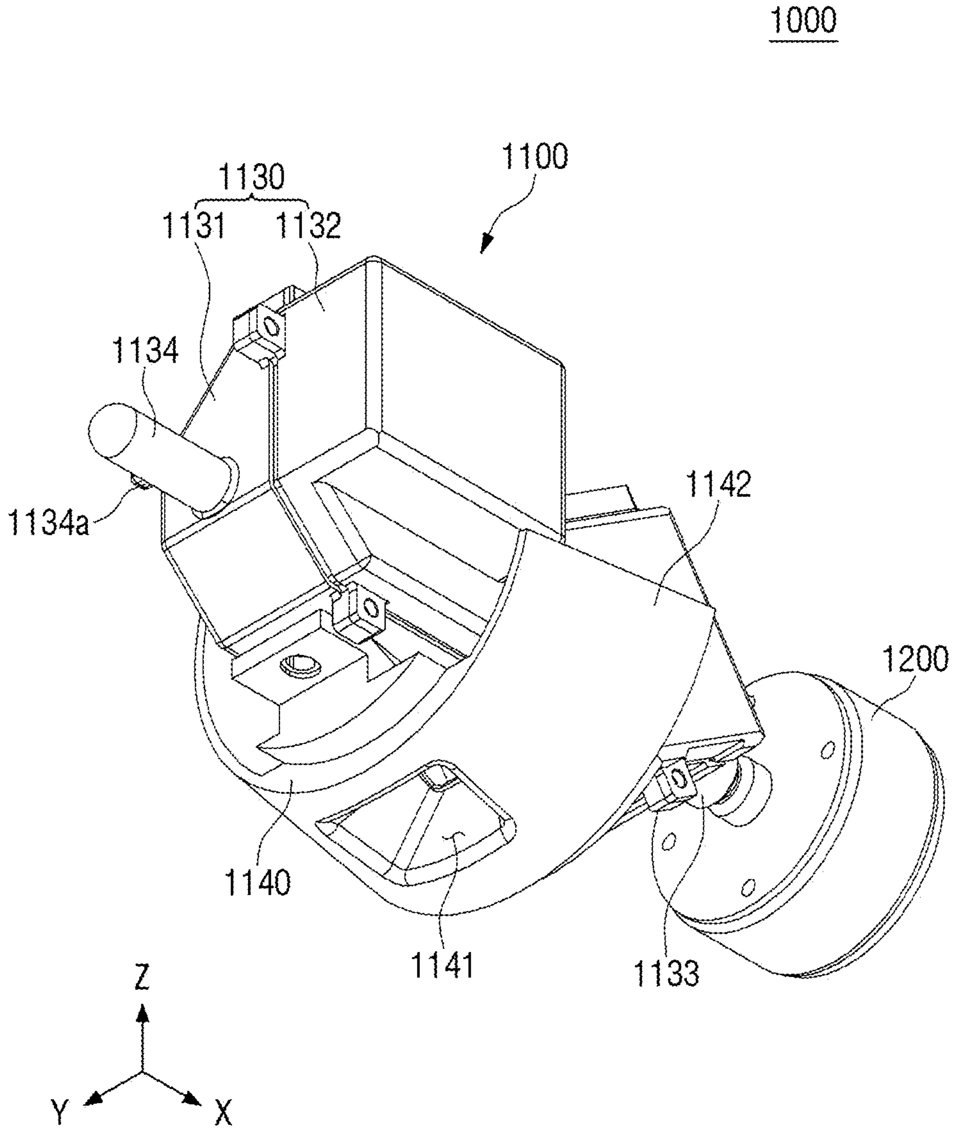
Figure 4:
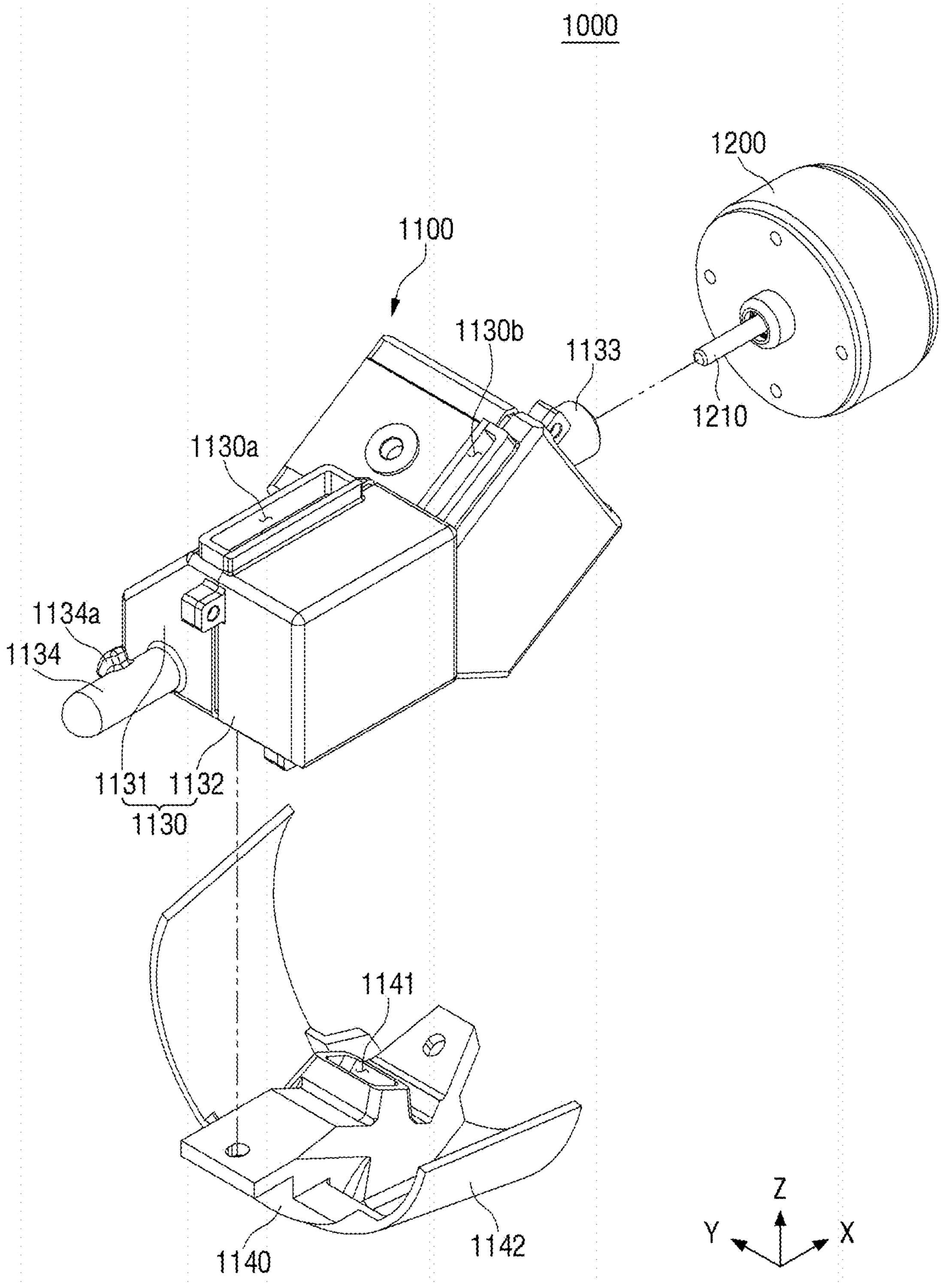
FIGS. 4 to 6 are exploded perspective views illustrating the lighting device according to an embodiment of the present disclosure.
Figure 5:
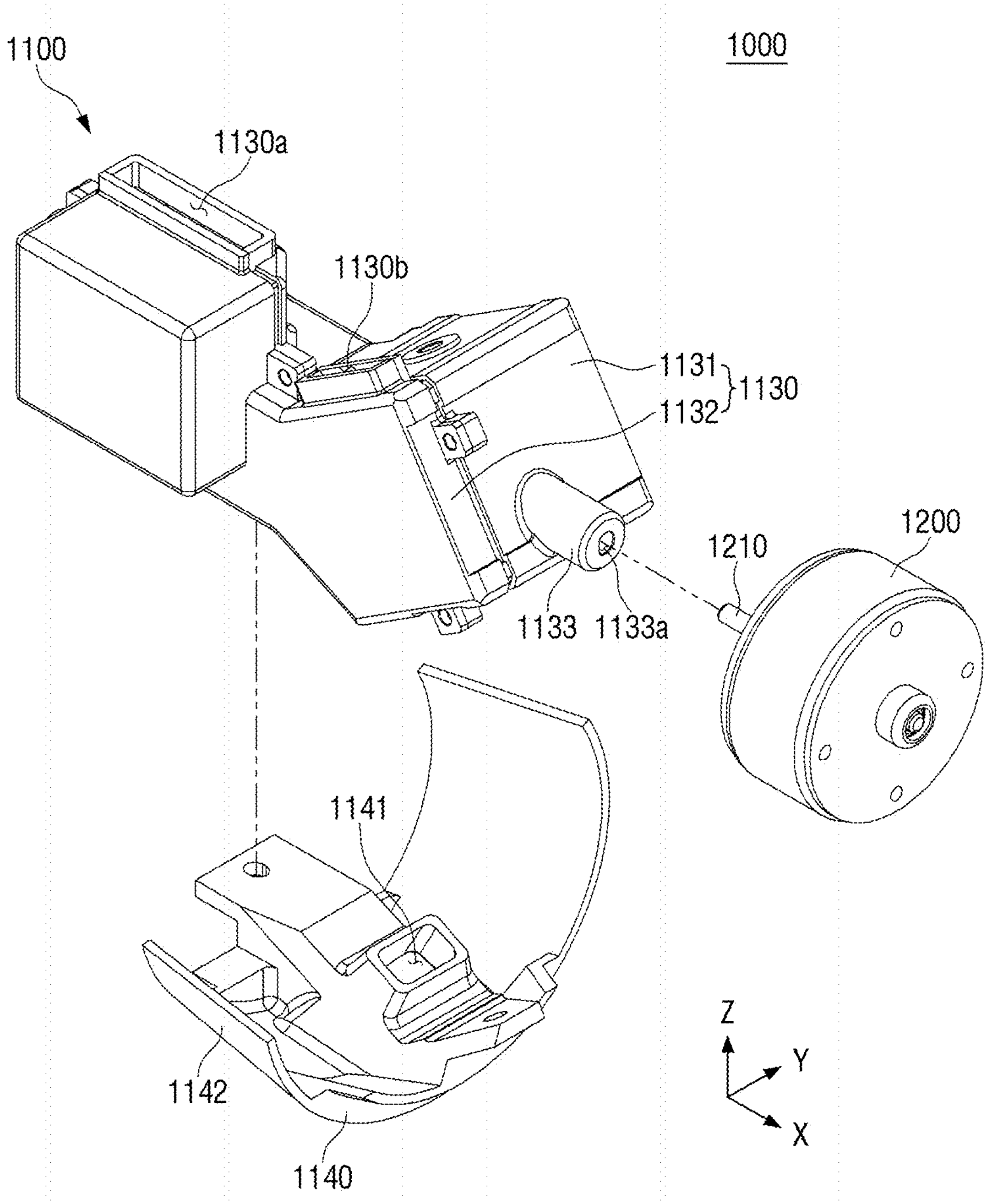
Figure 6:
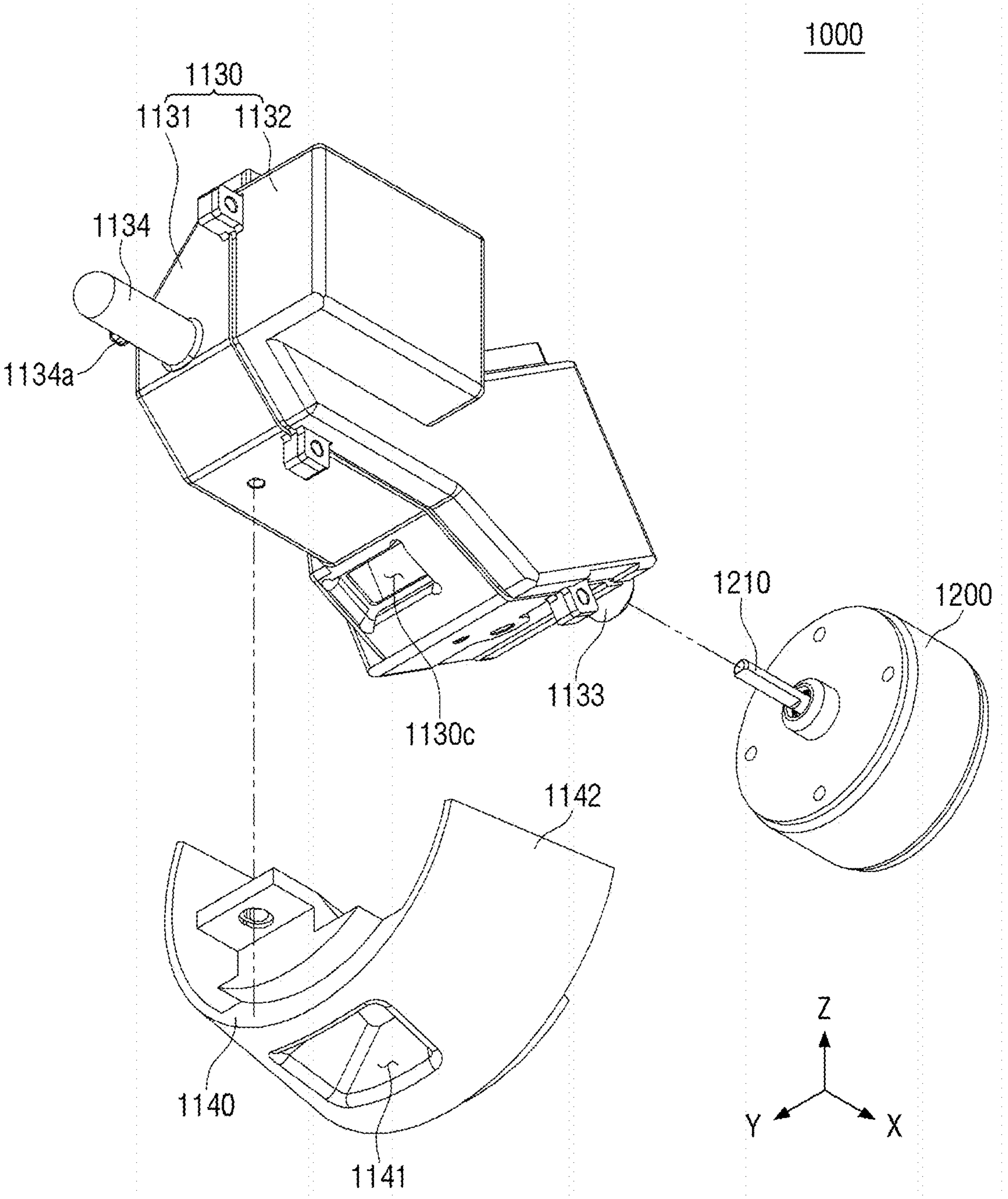

FIGS. 1 to 3 are perspective views illustrating a lighting device according to an embodiment of the present disclosure, and FIGS. 4 to 6 are exploded perspective views illustrating the lighting device according to an embodiment of the present disclosure.

Referring to FIGS. 1 to 6, a lighting device 1000 according to an embodiment of the present disclosure may include a light irradiation unit 1100 and a driving unit 1200. Hereinafter, in the drawings according to an embodiment of the present disclosure, a case where an X-axis is a left-right direction and refers to a vehicle width direction (e.g., a lateral direction), a Y-axis refers to a front-back direction (e.g., a longitudinal direction), and a Z-axis is an up-down direction and refers to a vehicle height direction (e.g., a vertical direction) will be described by way of example.

In an embodiment of the present disclosure, the lighting device 1000 may be used for various functions including: an illumination function such as a headlamp that secures a field of view of a driver when operating a vehicle at low-light conditions (e.g., at night); a signaling function such as a position lamp, a daytime running lamp (DRL), a turn signal lamp, or a brake lamp that notifies a surrounding vehicle or a pedestrian of a driving state of the vehicle; and a function to form a pattern image conveying various information on a road surface around the vehicle. The lighting device 1000 according to the present disclosure may be used for a single function among the above-mentioned functions or used for two or more of the above-mentioned functions.

Hereinafter, in an embodiment of the present disclosure, a case where the lighting device 1000 is used for the function that forms the pattern image on the road surface around the vehicle will be described by way example. Further, in an embodiment of the present disclosure, a case where the pattern image is used for the purpose of notifying the surrounding vehicle or the pedestrian of the state of the vehicle or used for the purpose of a welcome function or a farewell function that makes the vehicle respond when a passenger embarks or disembarks the vehicle will be described by way of example. However, the present disclosure is not limited thereto, and the pattern image may be used for the purpose of indicating various information that needs to be notified to the surrounding vehicle or the pedestrian, including the passenger.

In addition, in an embodiment of the present disclosure, a case where the lighting device 1000 is used for the function that forms the pattern image on the road surface around the vehicle will be described by way example. However, the present disclosure is not limited thereto, and the lighting device 1000 according to the present disclosure may be similarly applied to a case where it is used for the illumination function or the signaling function.

Figure 7:
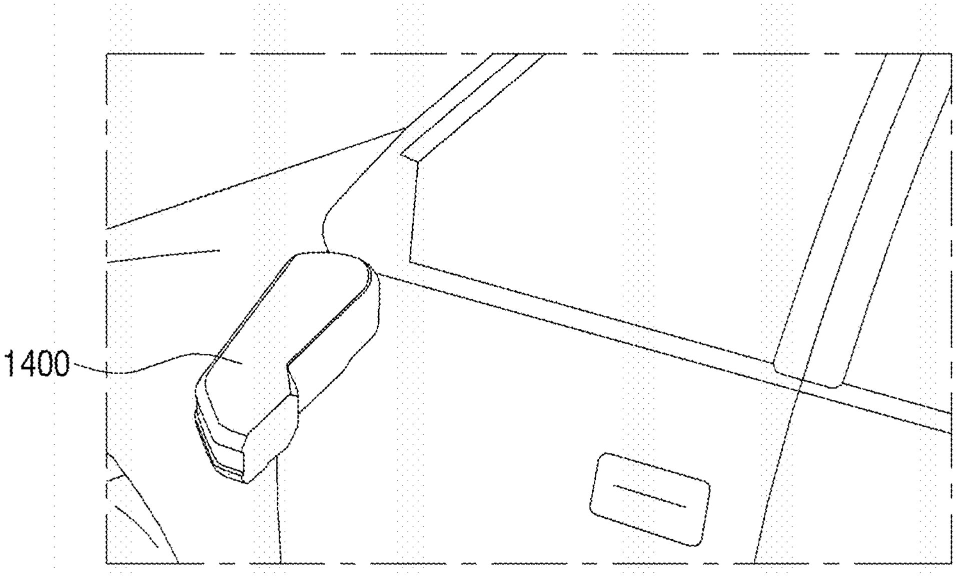
FIGS. 7 and 8 are schematic views illustrating a housing in which the lighting device according to an embodiment of the present disclosure is installed.
Figure 8:
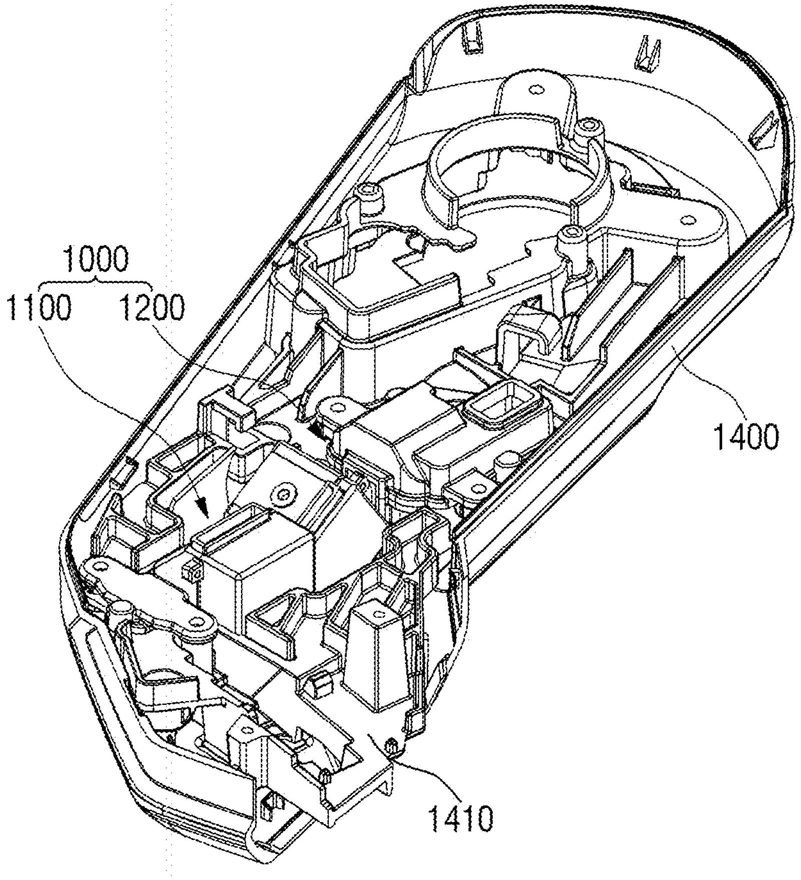

In an embodiment of the present disclosure, a case where the lighting device 1000 is mounted on a camera mirror that enables securing of a field of view for a side or side-rear direction of the vehicle as illustrated in FIGS. 7 and 8 will be described by way of example. However, this is only an example for assisting in the understanding of the present disclosure, and the present disclosure is not limited thereto. The lighting device 1000 according to the present disclosure may be mounted at various locations as the pattern images need to be formed by the lighting device 1000.

In this case, FIG. 8 is an example of a case where a portion of a mirror housing 1400 of the camera mirror is removed so that the lighting device 1000 according to the present disclosure may be viewed more clearly.

In FIGS. 7 and 8 described above, a case where a field of view is secured for the driver by displaying the surrounding image of the vehicle obtained by an imaging device (e.g., a camera) provided in the camera mirror through a display device provided in the vehicle will be described by way of example. However, the present disclosure is not limited thereto, and may be similarly applied to a case where a mirror is mounted, instead of the imaging device, for securing the field of view for the driver.

The mirror housing 1400 may include a mounting frame 1410 for mounting the lighting device 1000 according to the present disclosure, and the mounting frame 1410 may be manufactured integrally with the mirror housing 1400 or may be manufactured separately from the mirror housing 1400 and then coupled to the mirror housing 1400.

The light irradiation unit 1100 may emit light for forming a pattern image suitable for the purpose of the lighting device 1000 according to the present disclosure.

Figure 9:
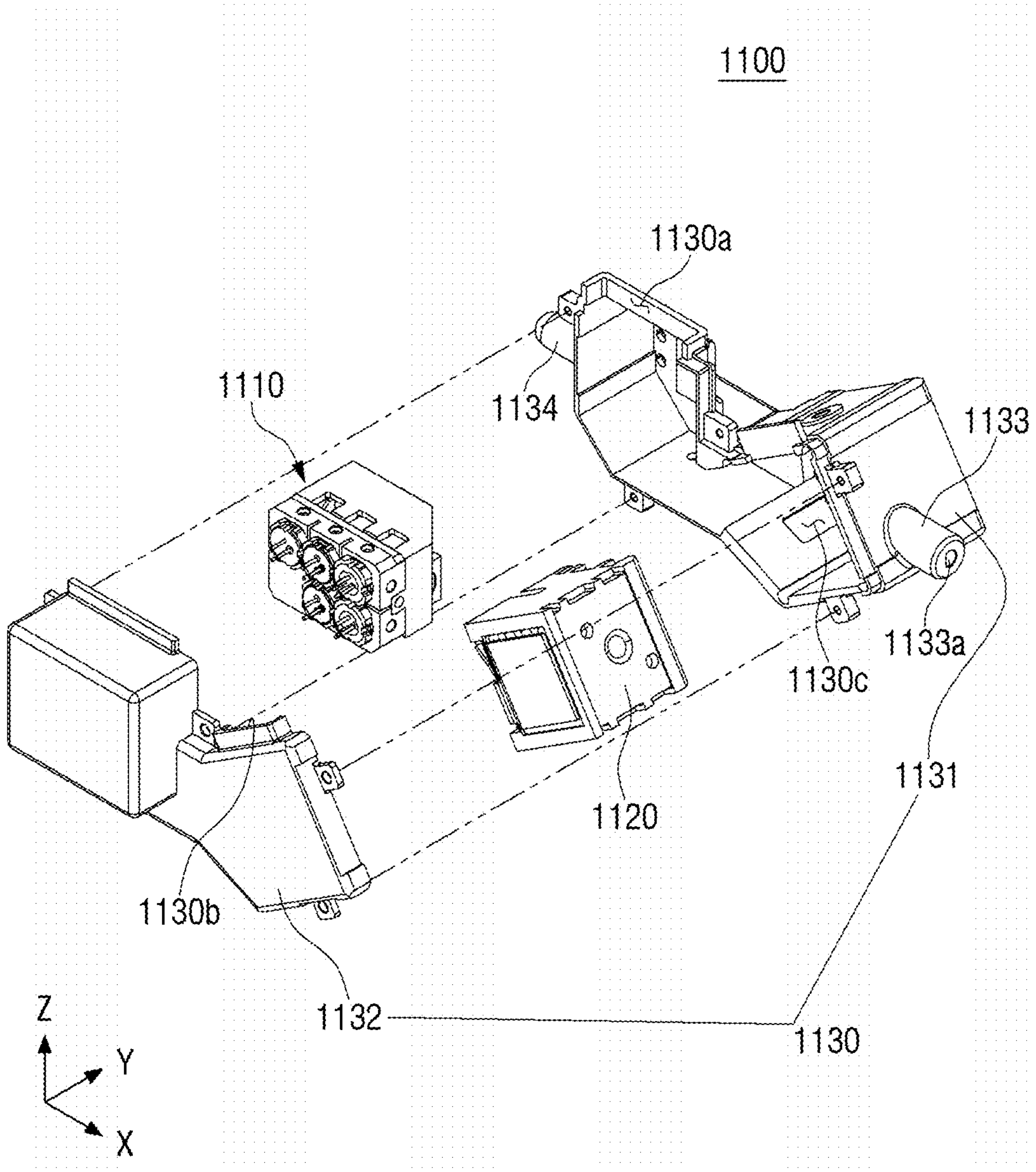
FIGS. 9 and 10 are exploded perspective views illustrating a light irradiation unit according to an embodiment of the present disclosure.
Figure 10:
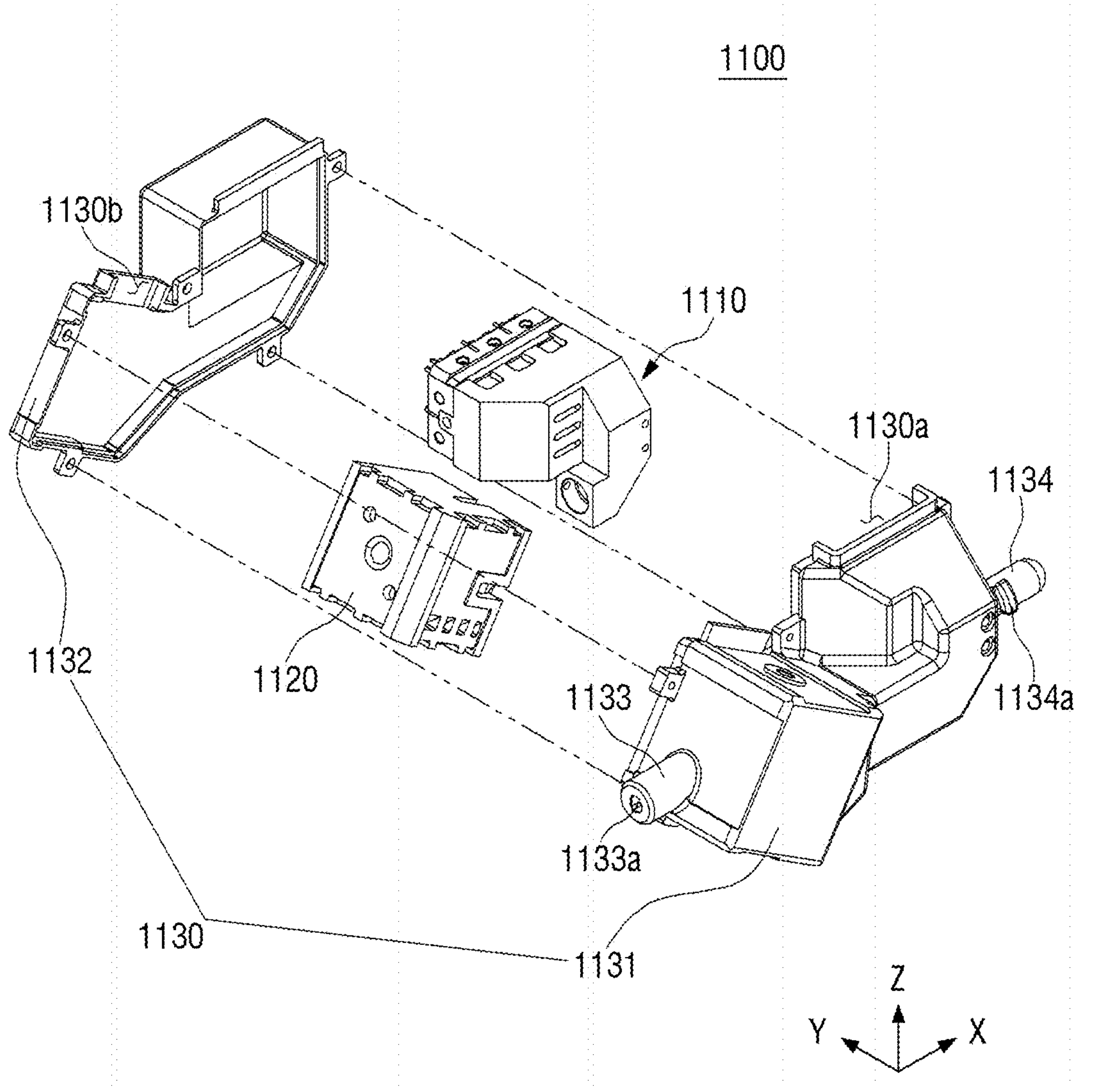

FIGS. 9 and 10 are exploded perspective views illustrating a light irradiation unit according to an embodiment of the present disclosure.

Referring to FIGS. 9 and 10, the light irradiation unit 1100 according to an embodiment of the present disclosure may include a light source unit 1110 and a light path adjustment unit 1120. The light source unit 1110 and the light path adjustment unit 1120 may be accommodated in a case 1130, where the case 1130 may include a first sub-case 1131 and a second sub-case 1132, which are detachably coupled to each other so that the light source unit 1110 and the light path adjustment unit 1120 may be accommodated therein. The first sub-case 1131 and the second sub-case 1132 may be coupled to each other by various means such as screwing, hooking, and an adhesive.

In an embodiment of the present disclosure, a case where the case 1130 includes two sub-cases 1131 and 1132 will be described by way of example. However, the present disclosure is not limited thereto, and the case 1130 may include a single sub-case or three or more sub-cases based on the layout or design purposes.

Figure 11:
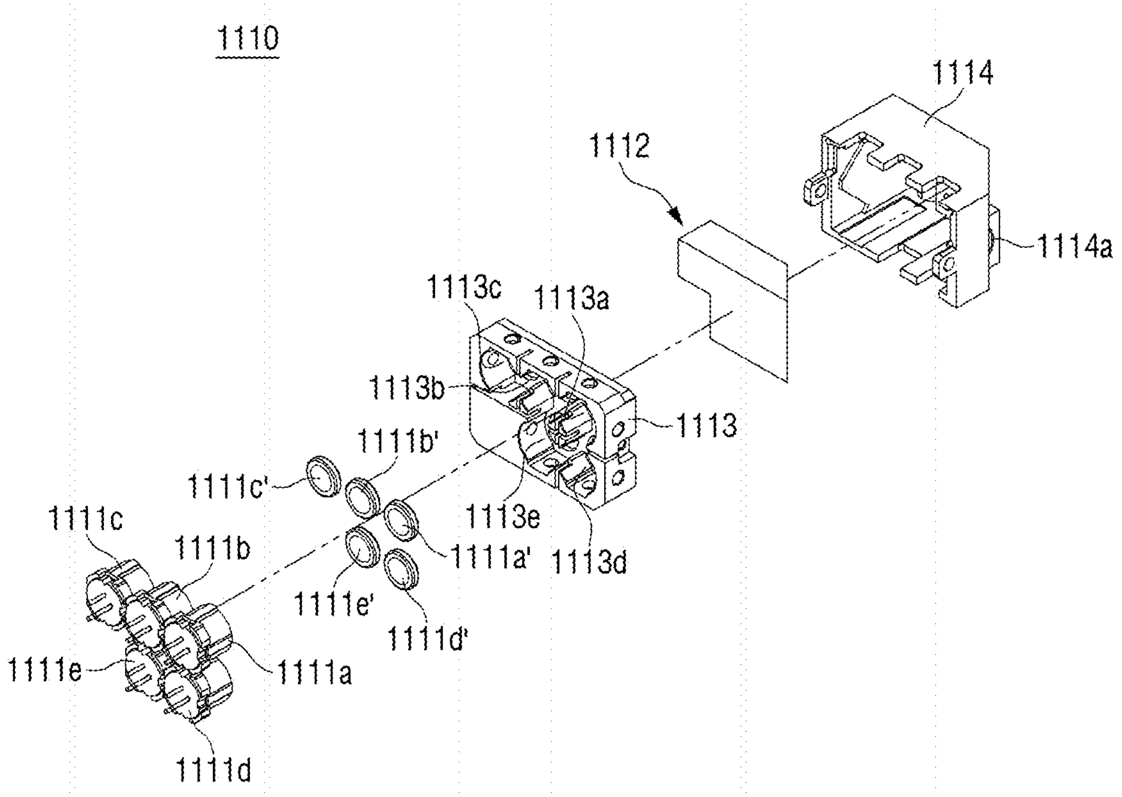
FIGS. 11 and 12 are exploded perspective views illustrating a light source unit according to an embodiment of the present disclosure.
Figure 12:
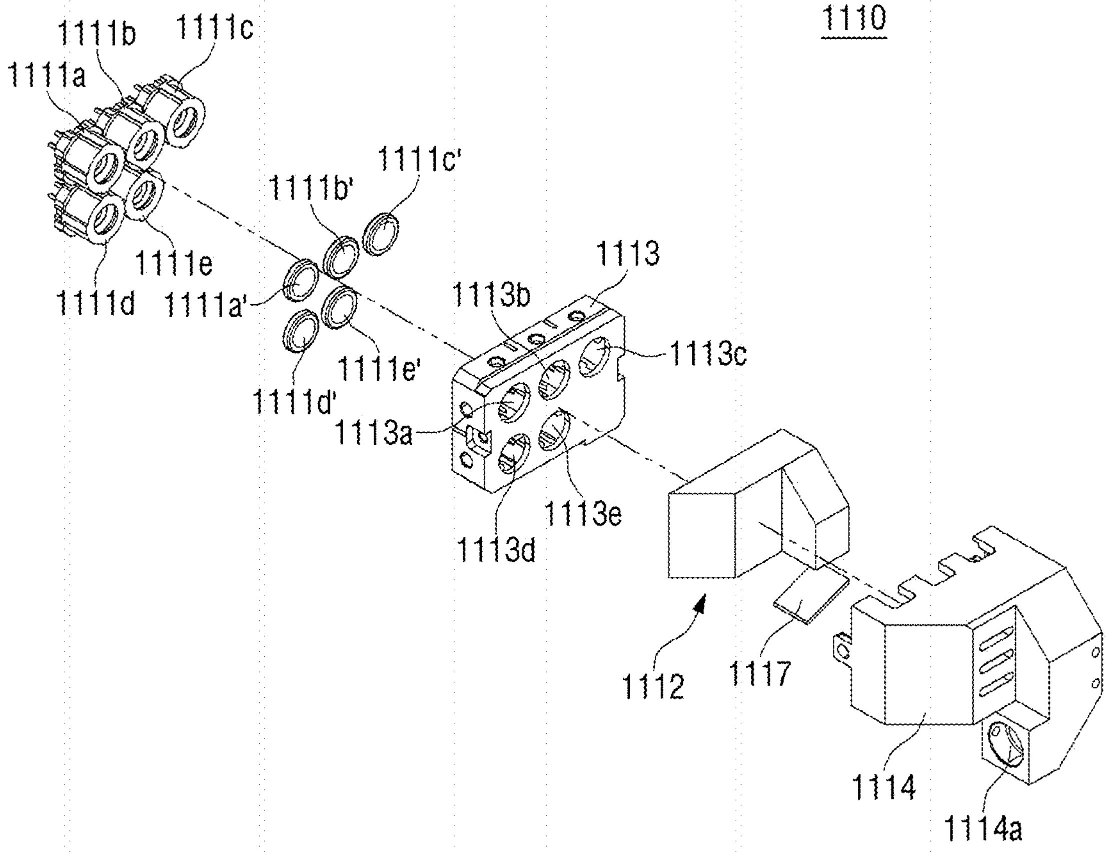

FIGS. 11 and 12 are exploded perspective views illustrating a light source unit according to an embodiment of the present disclosure.

Referring to FIGS. 11 and 12, the light source unit 1110 according to an embodiment of the present disclosure may include a plurality of light sources 1111*a*, 1111*b*, 1111*c*, 1111*d*, and 1111*e* and a light synthesis unit 1112. Light may be generated from at least one of the plurality of light sources 1111*a*, 1111*b*, 1111*c*, 1111*d*, and 1111*e* according to the desired attributes for the pattern image, including a color, brightness, a size, and the like, to be formed by the lighting device 1000 according to the present disclosure.

In an embodiment of the present disclosure, a case where two or more of the plurality of light sources 1111*a*, 1111*b*, 1111*c*, 1111*d*, and 1111*e* generate light of different colors will be described by way of example, which is to allow the pattern image formed by the lighting device 1000 according to the present disclosure to have more diverse colors due to the synthesis of the light generated from the plurality of light sources 1111*a*, 1111*b*, 1111*c*, 1111*d*, and 1111*e*. However, the present disclosure is not limited thereto, and the number of light sources included in the light source unit 1110 and/or the color of the light may be modified depending on the attributes of the pattern image to be formed by the lighting device 1000 according to the present disclosure.

In addition, the light generated from the plurality of light sources 1111*a*, 1111*b*, 1111*c*, 1111*d*, and 1111*e* may be collected (e.g., focused) by a plurality of light collecting lenses 1111*a*', 1111*b*', 1111*c*', 1111*d*', and 1111*e*', which respectively correspond to the plurality of light sources 1111*a*, 1111*b*, 1111*c*, 1111*d*, and 1111*e*, such that light efficiency may be improved.

The plurality of light sources 1111*a*, 1111*b*, 1111*c*, 1111*d*, and 1111*e* may be mounted in and fixed into a heat dissipation unit 1113 together with the plurality of light collecting lenses 1111*a*', 1111*b*', 1111*c*', 1111*d*', and 1111*e*'. This configuration may allow the locations of the plurality of light sources 1111*a*, 1111*b*, 1111*c*, 1111*d*, and 1111*e* to be fixed and may allow the heat generated when the light is generated from the plurality of light sources 1111*a*, 1111*b*, 1111*c*, 1111*d*, and 1111*e* to be more efficiently dissipated so that degradation of light emitting performance due to the heat may be prevented or reduced.

The heat dissipation unit 1113 may include a plurality of guide apertures 1113*a*, 1113*b*, 1113*c*, 1113*d*, and 1113*e* that guide the light generated from each of the plurality of light sources 1111*a*, 1111*b*, 1111*c*, 1111*d*, and 1111*e*. As such, light interference between the light generated from different light sources of the plurality of light sources 1111*a*, 1111*b*, 1111*c*, 1111*d*, and 1111*e* may be prevented by the plurality of guide apertures 1113*a*, 1113*b*, 1113*c*, 1113*d*, and 1113*e*.

Meanwhile, the plurality of light sources 1111*a*, 1111*b*, 1111*c*, 1111*d*, and 1111*e* may be disposed so that rows formed to extend in a first direction are arranged in a second direction, which configuration may secure an installation space when the lighting device 1000 according to the present disclosure is installed in a relatively tight space such as the mirror housing 1400. In this case, more light sources may be used compared to when the plurality of light sources 1111*a*, 1111*b*, 1111*c*, 1111*d*, and 1111*e* are disposed in a single row, and thus, more various light amounts and/or colors may be implemented.

In an embodiment of the present disclosure, a case where five light sources 1111*a*, 1111*b*, 1111*c*, 1111*d*, and 1111*e* are used will be described by way of example, in which three light sources 1111*a*, 1111*b*, and 1111*c* form a first row in the first direction, the other two light sources 1111*d* and 1111*e* form a second row in the first direction, and the first row and the second row are arranged in the second direction. In this exemplary embodiment, the light sources 1111*a* and 1111*d*, and 1111*b* and 1111*e* disposed in a row along the second direction may generate light of a same color, by way of example.

The light synthesis unit 1112 may synthesize the light generated from the plurality of light sources 1111*a*, 1111*b*, 1111*c*, 1111*d*, and 1111*e* to generate an irradiation light beam to be emitted by the lighting device 1000 according to the present disclosure.

Figure 13:
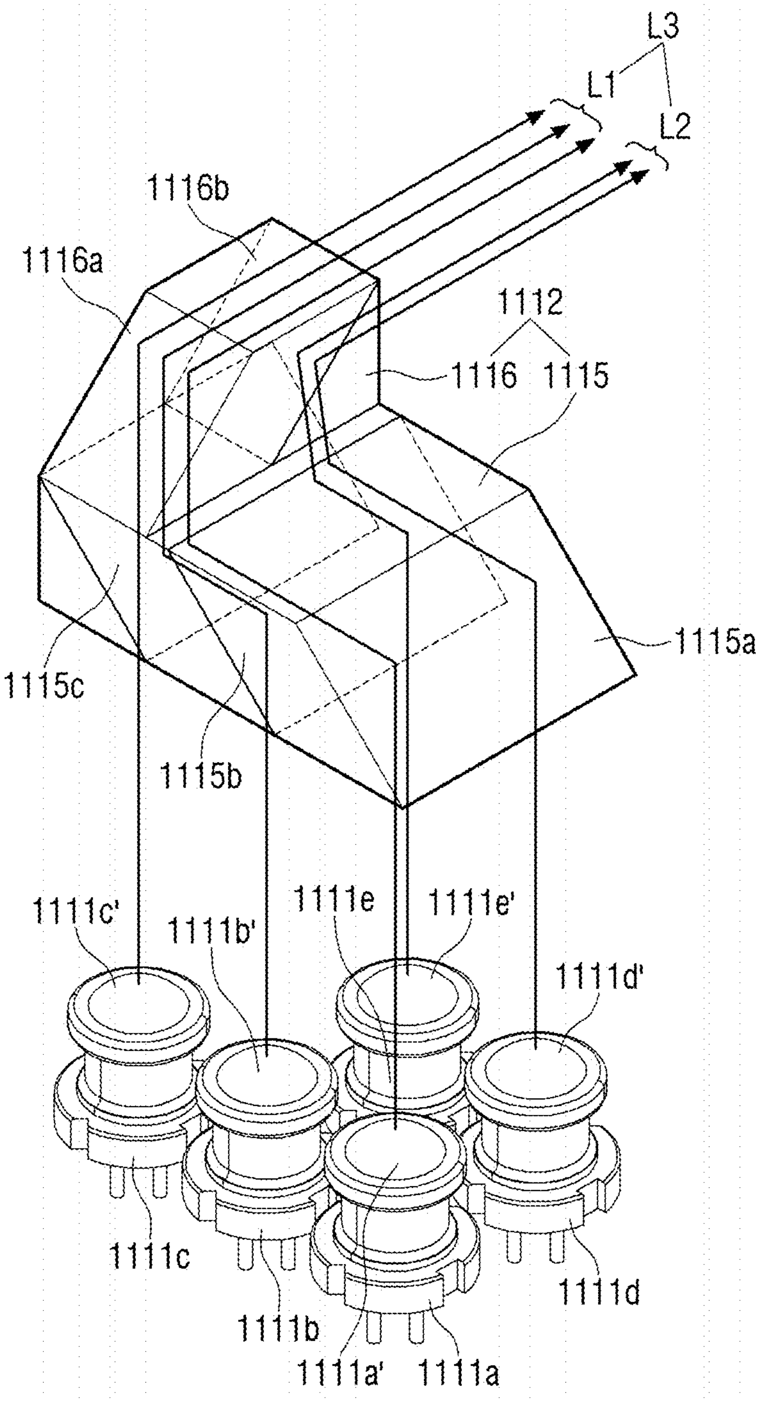
FIG. 13 is a schematic view illustrating a light path of a light synthesis unit according to an embodiment of the present disclosure.

FIG. 13 is a schematic view illustrating a light path of a light synthesis unit according to an embodiment of the present disclosure.

Referring to FIG. 13, the light synthesis unit 1112 according to an embodiment of the present disclosure may include a first synthesis unit 1115 and a second synthesis unit 1116. The first synthesis unit 1115 may generate first synthesis light L1 by synthesizing (e.g., combining) light from the light sources 1111*a*, 1111*b*, and 1111*c* included in the first row and may generate second synthesis light L2 by synthesizing (e.g., combining) light from the light sources 1111*d* and 1111*e* included in the second row. The second synthesis unit 1116 may generate third synthesis light L3 by synthesizing (e.g., combining) the first synthesis light L1 and the second synthesis light L2, and the third synthesis light L3 may be understood as the irradiation light emitted from the lighting device 1000 according to the present disclosure. Hereinafter, in an embodiment of the present disclosure, the third synthesis light L3 will be referred to as the irradiation light.

The first synthesis unit 1115 may include a plurality of reflective surfaces 1115*a*, 1115*b*, and 1115*c* that selectively transmit light of some wavelengths therethrough and selectively reflect light of some other wavelengths, and the second synthesis unit 1116 may also include a plurality of reflective surfaces 1116*a* and 1116*b* that selectively transmit light of some wavelengths therethrough and selectively reflect light of some other wavelengths therethrough, similar to the first synthesis unit 1115. Each of the plurality of reflective surfaces 1115*a*, 1115*b*, 1115*c*, 1116*a*, and 1116*b* may be implemented with a dichroic mirror. For this reason, even when the plurality of light sources 1111*a*, 1111*b*, 1111*c*, 1111*d*, and 1111*e* are disposed in a plurality of rows, the light generated from the plurality of light sources 1111*a*, 1111*b*, 1111*c*, 1111*d*, and 1111*e* may be synthesized.

In an embodiment of the present disclosure, light sources of the same color among the light sources 1111*a*, 1111*b*, and 1111*c* of the first row and the light sources 1111*d* and 1111*e* of the second row are disposed in a row in the second direction, and thus, the light generated from the light sources of the same color may be reflected by the same reflective surface of the plurality of reflective surfaces 1115*a*, 1115*b*, and 1115*c* of the first synthesis unit 1115. For this reason, even when the plurality of light sources 1111*a*, 1111*b*, 1111*c*, 1111*d*, and 1111*e* are disposed to form the plurality of rows, the light synthesis unit 1112 may be shared.

Meanwhile, the light synthesis unit 1112 may be accommodated in a space formed by the heat dissipation unit 1113 and a fixing cover 1114 coupled to the heat dissipation unit 1113 so that the location of the light synthesis unit 1112 may be fixed. The fixing cover 1114 may have an aperture 1114*a* formed on one side thereof so that the irradiation light generated by the light synthesis unit 1112 may travel to the light path adjustment unit 1120.

In an embodiment of the present disclosure, since the aperture 1114*a* is formed to cross a travel direction of the irradiation light, a reflection mirror 1117 that reflects the irradiation light may be included so that the irradiation light may travel toward the aperture 1114*a*. However, the present disclosure is not limited thereto, and the reflection mirror 1117 may be omitted in a configuration where the aperture 1114*a* is disposed along the travel direction of the irradiation light.

The light path adjustment unit 1120 may be disposed closer to the vehicle body in the lateral direction than the light source unit 1100 and may adjust the light path so that the irradiation light of the light source unit 1110 may travel toward a desired target direction.

Figure 14:
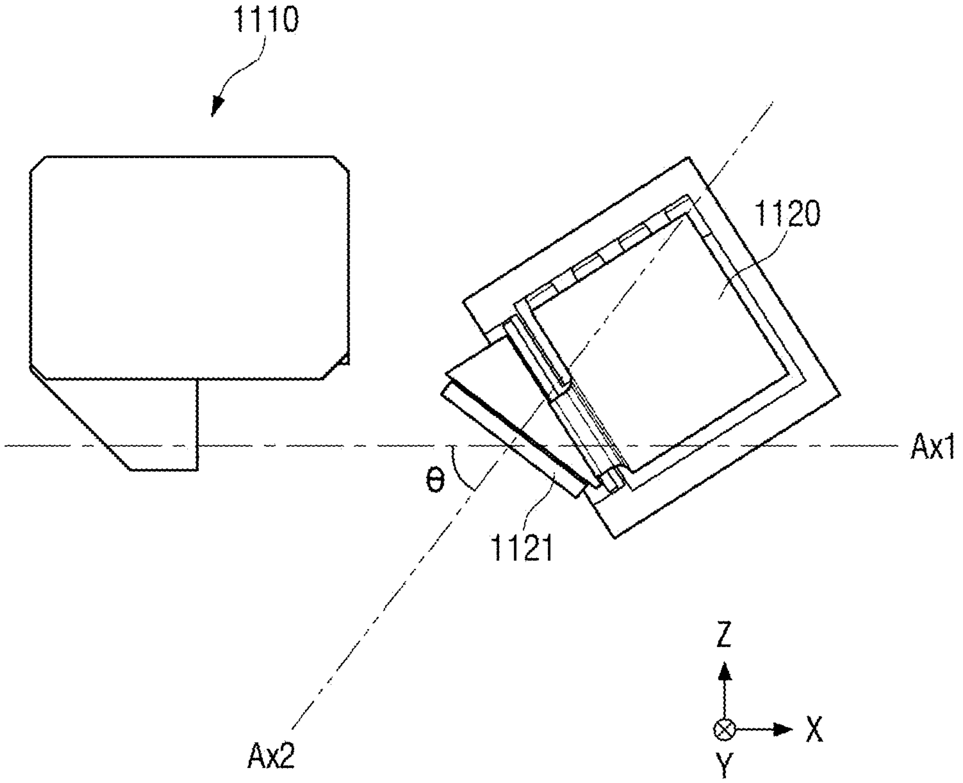
FIG. 14 is a side view illustrating the light source unit and a light path adjustment unit according to an embodiment of the present disclosure.

FIG. 14 is a side view illustrating the light source unit and a light path adjustment unit according to an embodiment of the present disclosure.

Referring to FIG. 14, the light path adjustment unit 1120 according to an embodiment of the present disclosure may adjust the light path so that the irradiation light generated from the light source unit 1110 may travel in the target direction.

In an embodiment of the present disclosure, the light path adjustment unit 1120 may include at least one reflective surface 1121 that reflects the irradiation light, and the light reflected by the at least one reflective surface 1121 may be emitted to the road surface around the vehicle, such that a pattern image suitable for the purpose of the lighting device 1000 according to the present disclosure may be formed thereon.

The target direction may be determined based on a tilting angle θ between a main axis Ax1 of the light source unit 1110 and a main axis Ax2 of the light path adjustment unit 1120. Herein, the tilting angle θ may be measured as an angle of rotation around the Y-axis. The main axis Ax1 of the light source unit 1110 may be understood as an axis parallel to the travel direction of the generated irradiation light, and the main axis Ax2 of the light path adjustment unit 1120 may be understood as an axis that is normal to the at least one reflective surface 1121.

Hereinafter, in an embodiment of the present disclosure, the main axis Ax1 of the light source unit 1110 will be referred to as a "first main axis", and the main axis Ax2 of the light path adjustment unit 1120 will be referred to as a "second main axis".

In some embodiments, the light path adjustment unit 1120 may include an actuator for adjusting the tilting angle θ of the second main axis Ax2 with respect to the first main axis Ax1, the tilting angle θ being measured as an angle of rotation around the Y-axis.

In an embodiment of the present disclosure, a case where the light path adjustment unit 1120 is disposed closer to the vehicle in the lateral direction than the light source unit 1110 has been described. Therefore, as illustrated in FIG. 15, when the tilting angle θ between the first main axis Ax1 and the second main axis Ax2 is smaller (θ1>θ2), the distance from the vehicle to the pattern image P may be greater (d1<d2).

Figure 15:
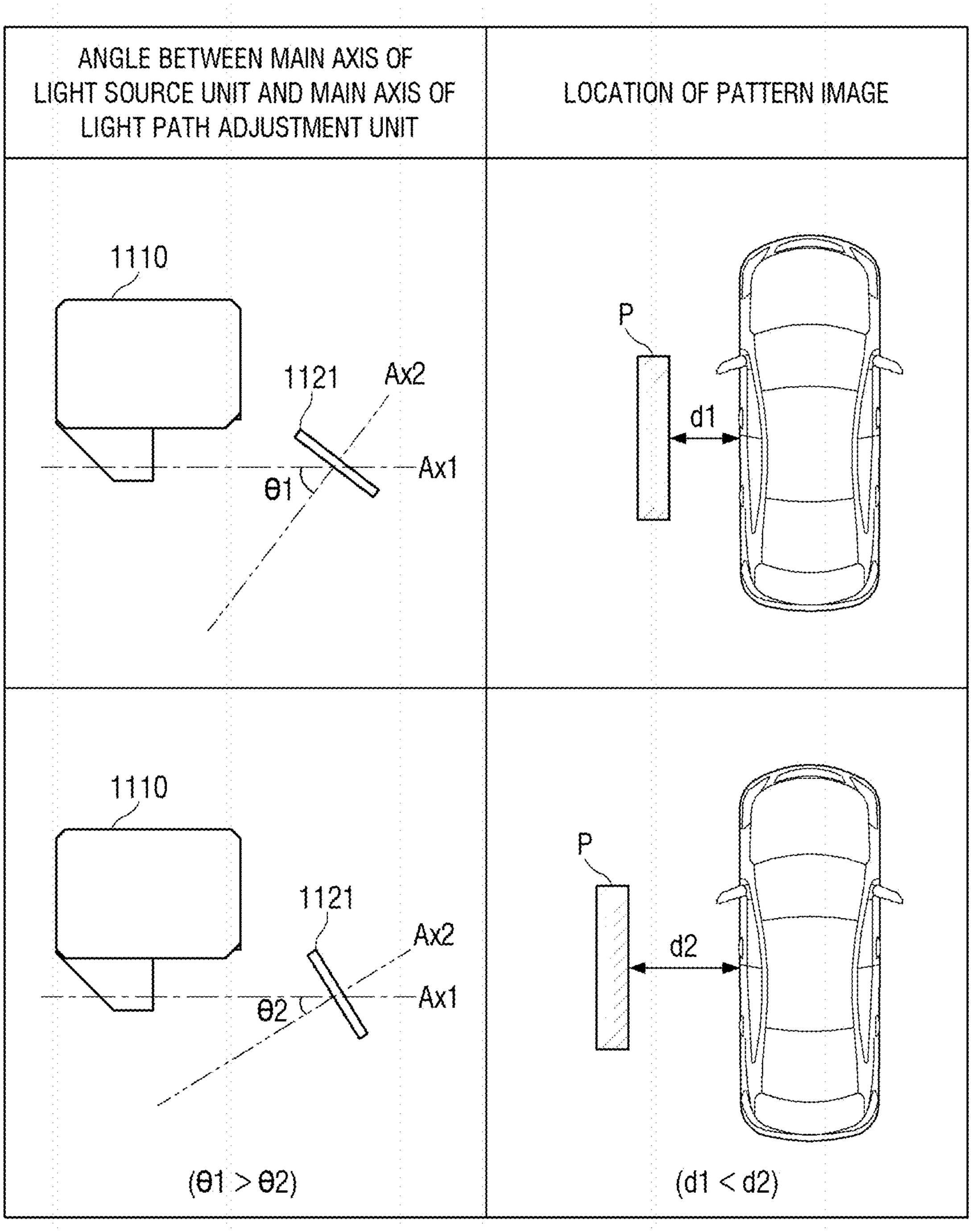
FIG. 15 is a schematic view illustrating locations where pattern images are formed according to tilting angles between a main axis of the light source unit and a main axis of the light path adjustment unit according to an embodiment of the present disclosure.

In this case, FIG. 15 is an example of a case where only the at least one reflective surface 1121 is illustrated among the components of the light path adjustment unit 1120 for convenience of explanation. As such, by adjusting the tilting angle θ of the second main axis Ax2 with respect to the first main axis Ax1, the light emitted from the lighting device 1000 according to the present disclosure may be prevented from being interfered with by the vehicle body.

In an embodiment of the present disclosure, a case where the light path adjustment unit 1120 includes a single reflective surface 1121 has been described by way of example. However, the present disclosure is not limited thereto, and the light path adjustment unit 1120 may also include a plurality of reflective surfaces whose tilting angles may be individually adjusted. In some such embodiments, an array of micro mirrors, such as those implemented with micro electro-mechanical systems (MEMS) technologies, may constitute the plurality of reflective surfaces of the light path adjustment unit 1120. In this case, a plurality of pattern images may be simultaneously formed at different locations around the vehicle by light reflected by the plurality of reflective surfaces.

In addition, a display panel such as a liquid crystal panel or a digital light processing (DLP) unit may be disposed on the travel path of the irradiation light generated from the light source unit 1110. In this case, the pattern image may be formed in more various shapes by adjusting light transmissivity of each pixel of the display panel.

Herein, the expression that a display panel may be disposed on the travel path of the irradiation light generated from the light source unit 1110 may mean that the display panel may be disposed between the light source unit 1110 and the light path adjustment unit 1120 along the travel path of the irradiation light or that the display panel may be disposed on a path of the irradiation light that is reflected by the light path adjustment unit 1120 and travels.

In the above-described embodiment, a case where the display panel is disposed in front (e.g., upstream) of or behind (e.g., downstream) the light path adjustment unit 1120 has been described by way of example. However, the present disclosure is not limited thereto, and the display panel may replace the at least one reflective surface 1121. In such a configuration, the irradiation light generated from the light source unit 1110 may be directly transmitted through the display panel, such that the pattern image may be formed, and the location of the light source unit 1110 may also be modified so that the irradiation light of the light source unit 1110 may be directly emitted to the display panel.

Figure 16:
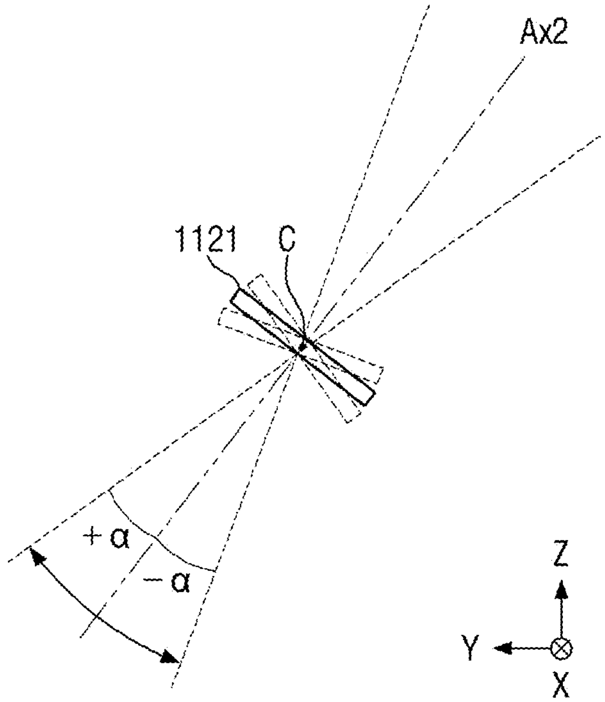
FIG. 16 is a schematic view illustrating a reflective surface tilted with respect to the main axis of the light path adjustment unit according to an embodiment of the present disclosure.

Meanwhile, as illustrated in FIG. 16, at least one reflective surface 1121 may be configured to be rotated around a rotation axis C so as to be repeatedly tilted at a predetermined angle in at least one direction with respect to the second main axis Ax2 to allow the pattern image to be formed with an appropriate size. In some embodiments, the rotation axis C may be parallel with the X-axis. In some embodiments, the rotation axis C may be perpendicular to the second main axis Ax2 while being laid on the Z-X plane. FIG. 16 is an example where the at least one reflective surface 1121 is tilted at the same angles +α and −α in a forward and backward direction with respect to the second main axis Ax2, where "+" and "−" indicate directions in which at least one reflective surface 1121 is tilted with respect to the second main axis Ax2, and +α and −α may be understood as indicating the same angle in opposite directions with respect to the second main axis Ax2.

Figure 17:
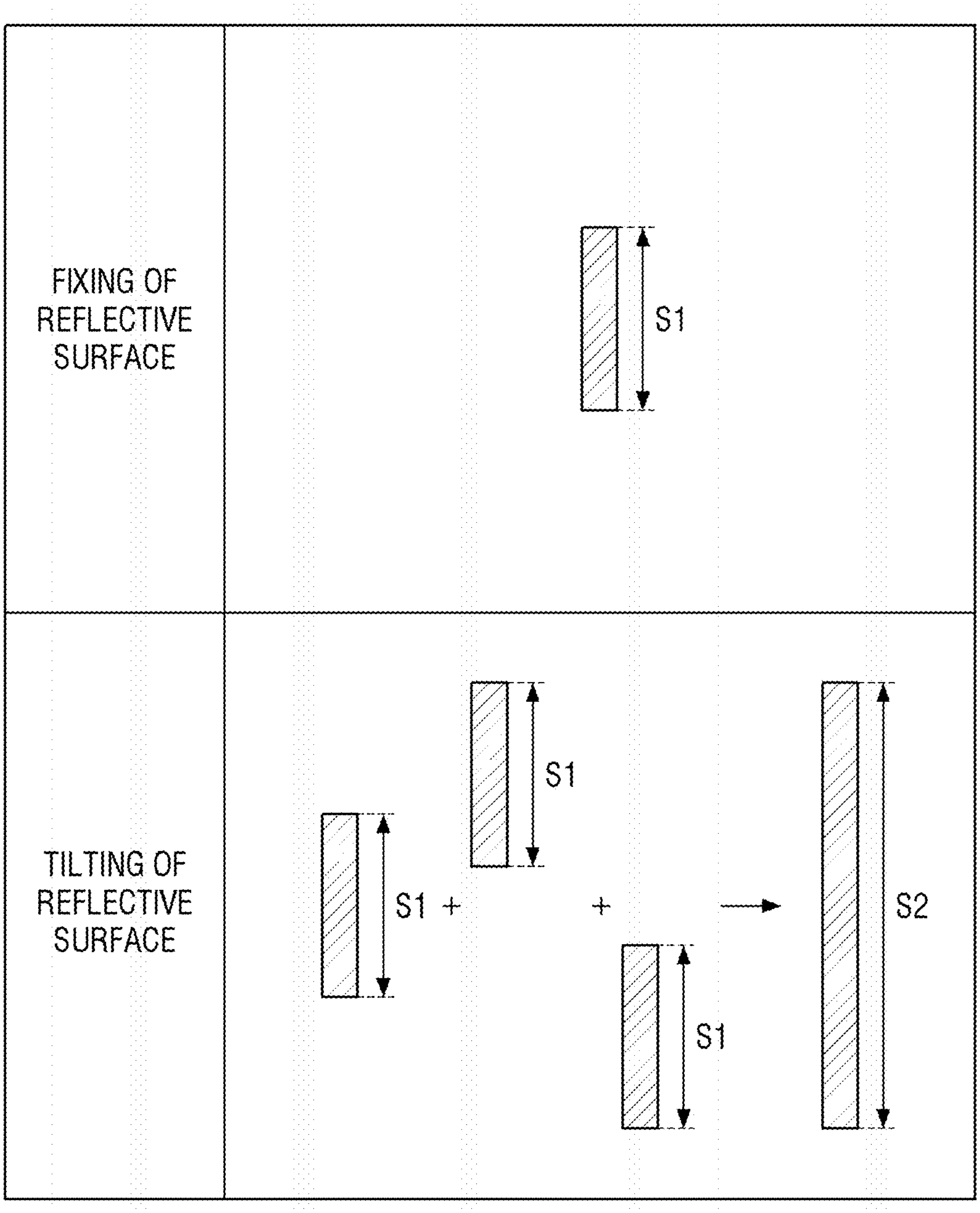
FIG. 17 is a schematic view illustrating a pattern image formed according to tilting of the reflective surface with respect to the main axis of the light path adjustment unit according to an embodiment of the present disclosure.

In other words, as illustrated in FIG. 17, if the at least one reflective surface 1121 is rapidly and repeatedly (e.g., periodically with a predetermined frequency) tilted alternately in the forward and backward direction (e.g., oscillates) with respect to the second main axis Ax2, the pattern images formed according to tilting angles of at least one reflective surface 1121 may be synthesized, such that a pattern image may be formed to have a size S2 that is greater than a size S1 of an individual pattern image, which would be formed when at least one reflective surface 1121 was fixed without being tilted with respect to the second main axis Ax2.

In some embodiments, the tilting angles of the plurality of reflective surfaces of the light path adjustment unit 1120 may be set individually. As such, the size of the pattern image that is reflected by and projected from the at least one reflective surface 1121 may be adjusted. By way of example, when the array of micro mirrors are tilted outward by greater degrees, a larger pattern images may be projected, and vice versa.

The case 1130 may include a plurality of connection apertures 1130*a* and 1130*b* for supplying operating power to the light source unit 1110 and the light path adjustment unit 1120 and for connecting wires for controlling the operation of the components, and may include a transmission aperture 1130*c* for transmitting the irradiation light, the light path of which has been adjusted by the light path adjustment unit 1120, therethrough.

In addition, a cover 1140 may be coupled to the case 1130. In the cover 1140, a passage aperture 1141 may be formed to correspond to the transmission aperture 1130*c*. The cover 1140 may be coupled to the case 1130 by screwing, hooking, an adhesive, or the like, and may be configured to be rotated integrally with the case 1130.

In this case, the expression that the cover 1140 may be rotated integrally with the case 1130 may mean that the cover 1140 and the case 1130 are manufactured integrally with each other, or that the cover 1140 and the case 1130 are manufactured separately and coupled to each other so that there is no relative movement therebetween.

Figure 18:
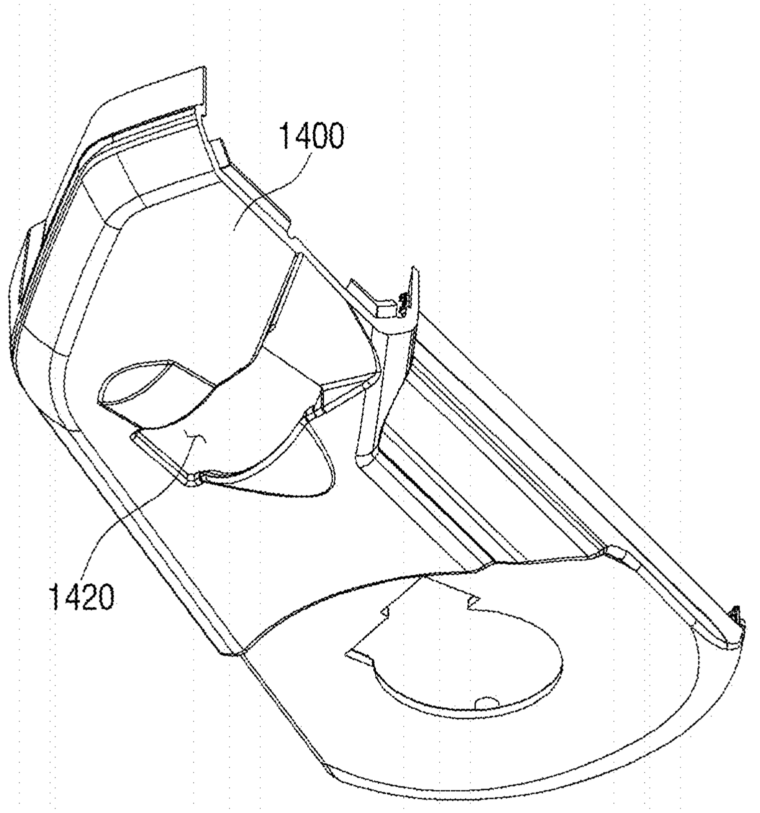
FIG. 18 is a schematic view illustrating an opening formed in the housing according to an embodiment of the present disclosure.

The mirror housing 1400 may include an opening 1420 formed to allow the light that travels via the transmission aperture 1130*c* and the passage aperture 1141 to proceed in the target direction, as illustrated in FIG. 18. Further, the cover 1140 may include a shielding surface 1142 formed around the passage aperture 1141 in order to shield at least a portion of the opening 1420.

Figure 19:
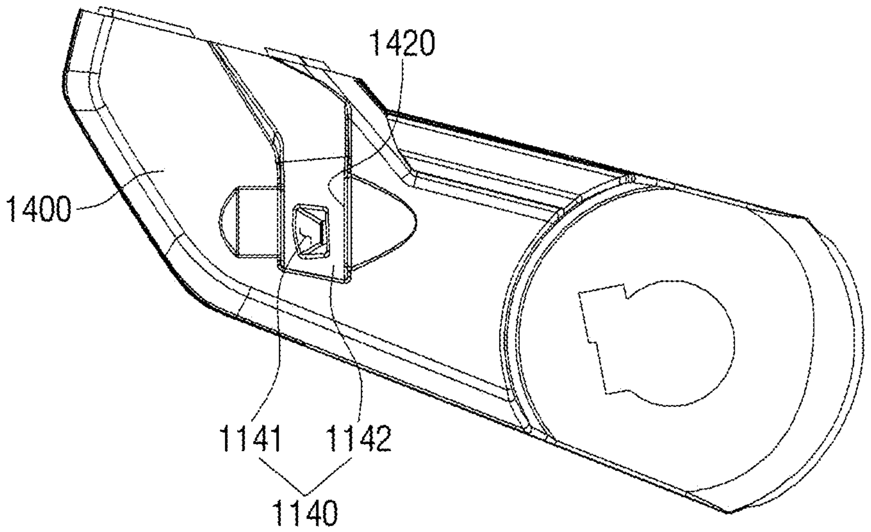
FIGS. 19 to 21 are schematic views illustrating a passage aperture of a cover whose location is changed within the opening of the housing by rotation of the light irradiation unit according to an embodiment of the present disclosure.
Figure 20:
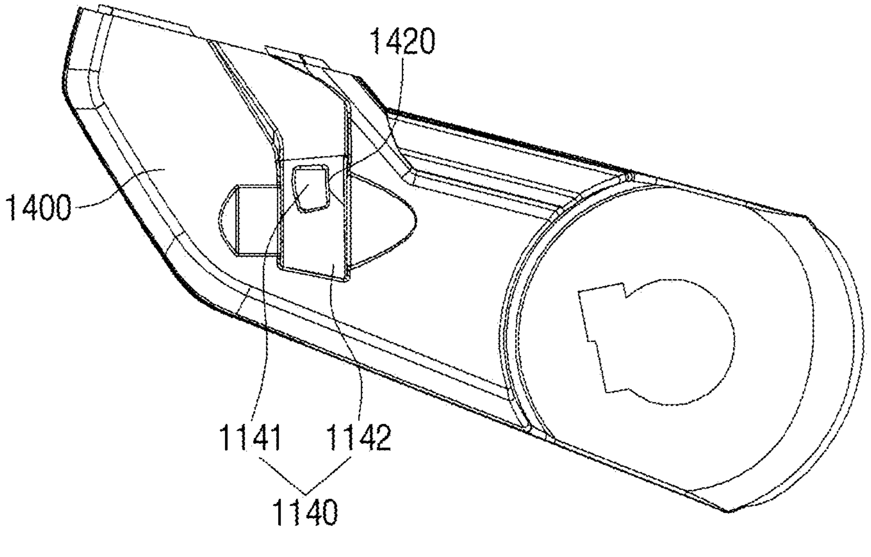

In other words, as the light irradiation unit 1100 is rotated by a driving unit 1200 to be described later, the cover 1140 may be rotated together with the light irradiation unit 1100 as illustrated in FIGS. 19 and 20, such that the location of the passage aperture 1141 may be changed, and thus, the direction in which the irradiation light is projected may change accordingly. The remaining area of the opening 1420 except for the passage aperture 1141 may be shielded by the shielding surface 1142, and thus, foreign substances may be prevented from being introduced from the outside.

Figure 21:
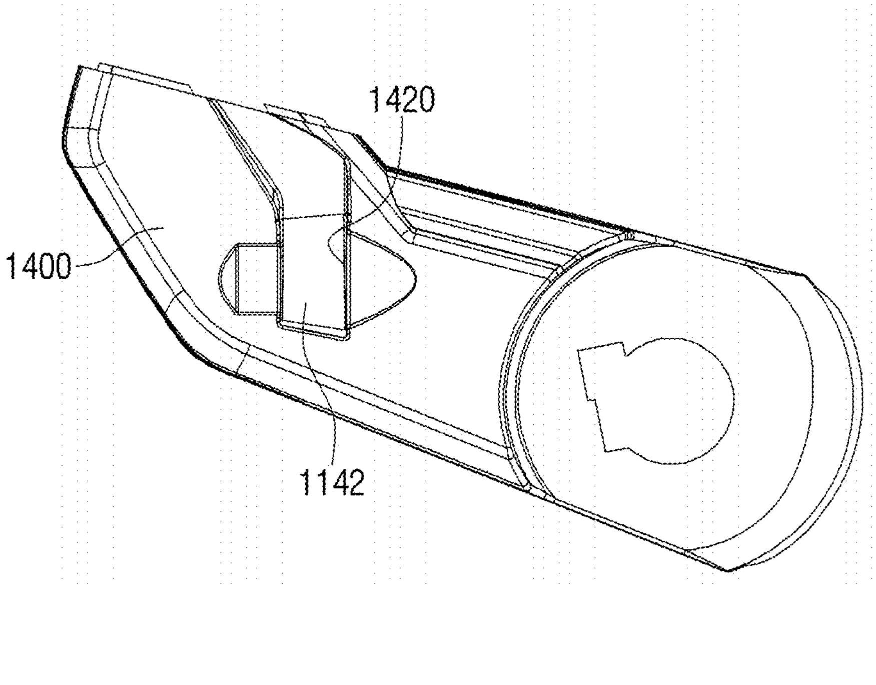

In addition, when no pattern image is formed by the lighting device 1000 according to the present disclosure, the cover 1140 may be rotated so that the passage aperture 1141 may not be exposed through the opening 1420. In such a case, the opening 1420 may be shielded by the shielding surface 1142 of the cover 1140, as illustrated in FIG. 21, and thus, foreign substances may be prevented from being introduced into the mirror housing 1400 from the outside.

Figure 22:
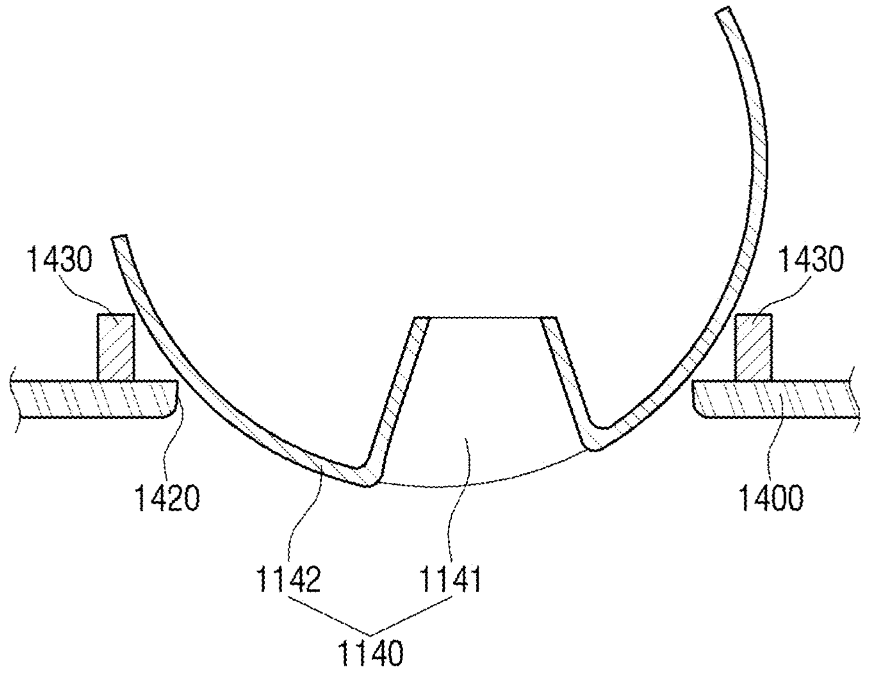
FIG. 22 is a schematic view illustrating a sealing portion according to an embodiment of the present disclosure.

Meanwhile, the mirror housing 1400 may include a sealing portion 1430 formed around the opening 1420 so that a space between the opening 1420 and the cover 1140 may be sealed as illustrated in FIG. 22. In an embodiment of the present disclosure, a case where the sealing portion 1430 is formed to protrude from the periphery of the opening 1420 toward the cover 1140 will be described by way of example. However, this is merely an example for assisting in the understanding of the present disclosure, and the present disclosure is not limited thereto. The sealing portion 1430 may be formed in various structures and using various materials so as to protrude from at least one of the opening 1420 or the cover 1140 toward the other of the opening 1420 or the cover 1140 to seal a space between the opening 1420 and the edge of the cover 1140.

Referring to FIGS. 1 to 6 again, the driving unit 1200 may serve to adjust a location where the pattern image is formed by rotating the light irradiation unit 1100. The light irradiation unit 1100 may be coupled to a rotation rod 1210 of the driving unit 1200 to rotate around the rotation rod 1210 when the driving unit 1200 is driven. In this case, as illustrated in FIGS. 19 to 21 described above, the light irradiation unit 1100 may be rotated integrally with the cover 1140, so that the travel direction of the irradiation light may be adjusted.

The case 1130 may include a coupling shaft 1133 which is formed at one end of the case 1130 and extended in a direction of the rotation axis of the rotation rod 1210 so that the rotation rod 1210 may be inserted and coupled thereto. The case 1130 may also include a rotation shaft 1134 which is formed at the other end of the case 1130 and extended in the direction of the rotation rod 1210 so that the case may be rotatable in the mirror housing 1400.

A coupling groove 1133*a* into which the rotation rod 1210 of the driving unit 1200 is inserted and coupled may be formed in the coupling shaft 1133. In this case, the coupling groove 1133*a* may be formed in a non-circular shape (e.g., a half-circle shape or a square shape, etc.) that corresponds to the cross-sectional shape of the rotation rod 1210. Such a configuration may prevent relative movement of the rotation rod 1210 within the coupling groove 1133*a*, and therefore, may allow the driving torque of the driving unit 1200 to be properly transferred to the coupling shaft 1133. To this end, the rotation rod 1210 of the driving unit 1200 and the coupling shaft 1133 may be coupled via various means of key coupling or the like to transmit the torque.

Figure 23:
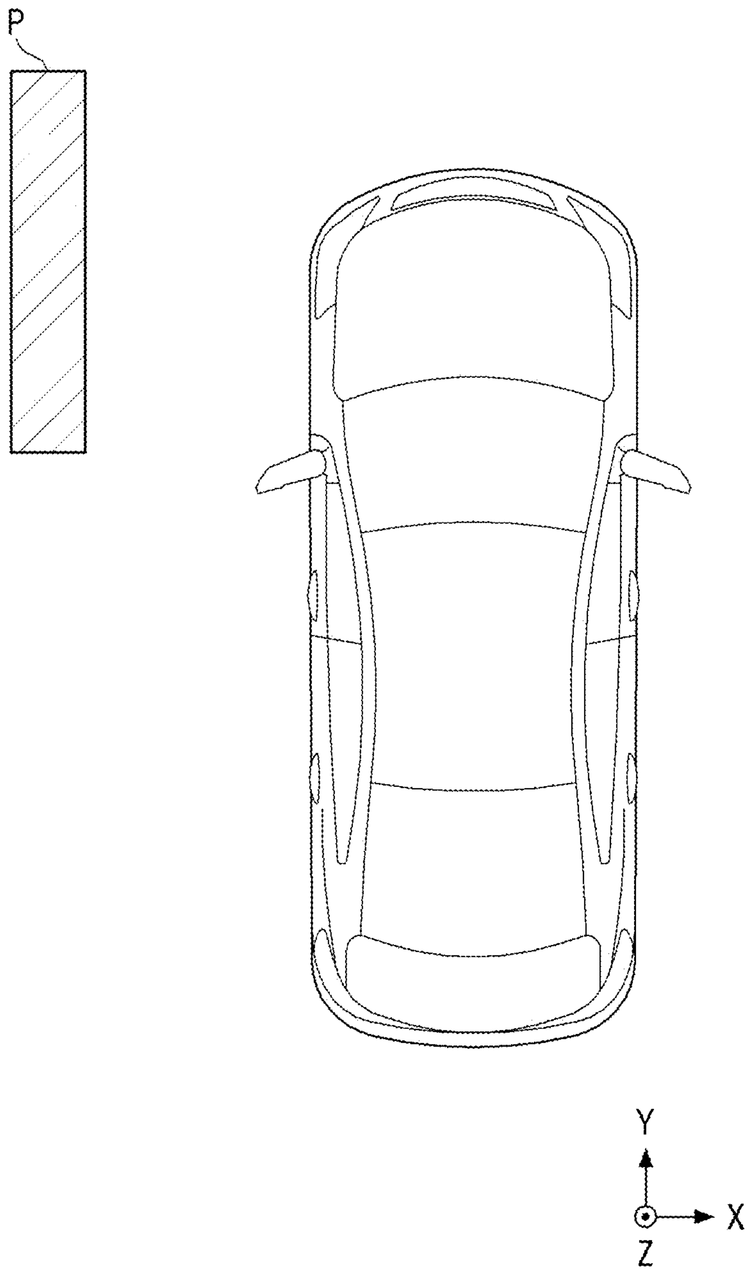
FIGS. 23 and 24 are schematic views illustrating locations where pattern images are formed by rotation of the light irradiation unit according to an embodiment of the present disclosure.
Figure 24:
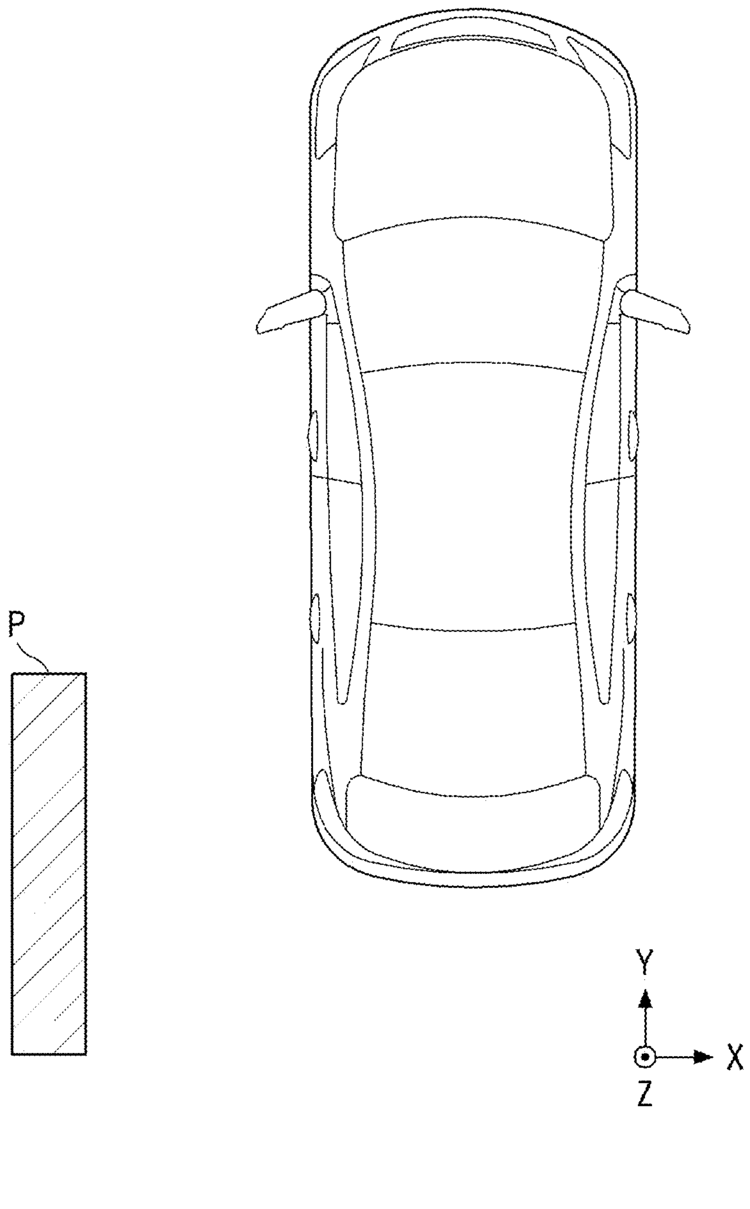

In an embodiment of the present disclosure, a case where the rotation rod 1210 is rotated around an axis substantially parallel to the vehicle width direction will be described by way of example. For this reason, when the light irradiation unit 1100 is rotated by the driving unit 1200, the location to which the pattern image is projected may be shifted in a forward and backward direction, as illustrated in FIGS. 23 and 24.

In a case where at least one of the coupling shaft 1133 or the rotation shaft 1134 is misaligned when the light irradiation unit 1100 is rotated by the driving unit 1200, there is a possibility that the pattern image will not be formed at a regular location, and thus, it is necessary to ensure that both the coupling shaft 1133 and the rotation shaft 1134 are properly aligned.

Figure 25:
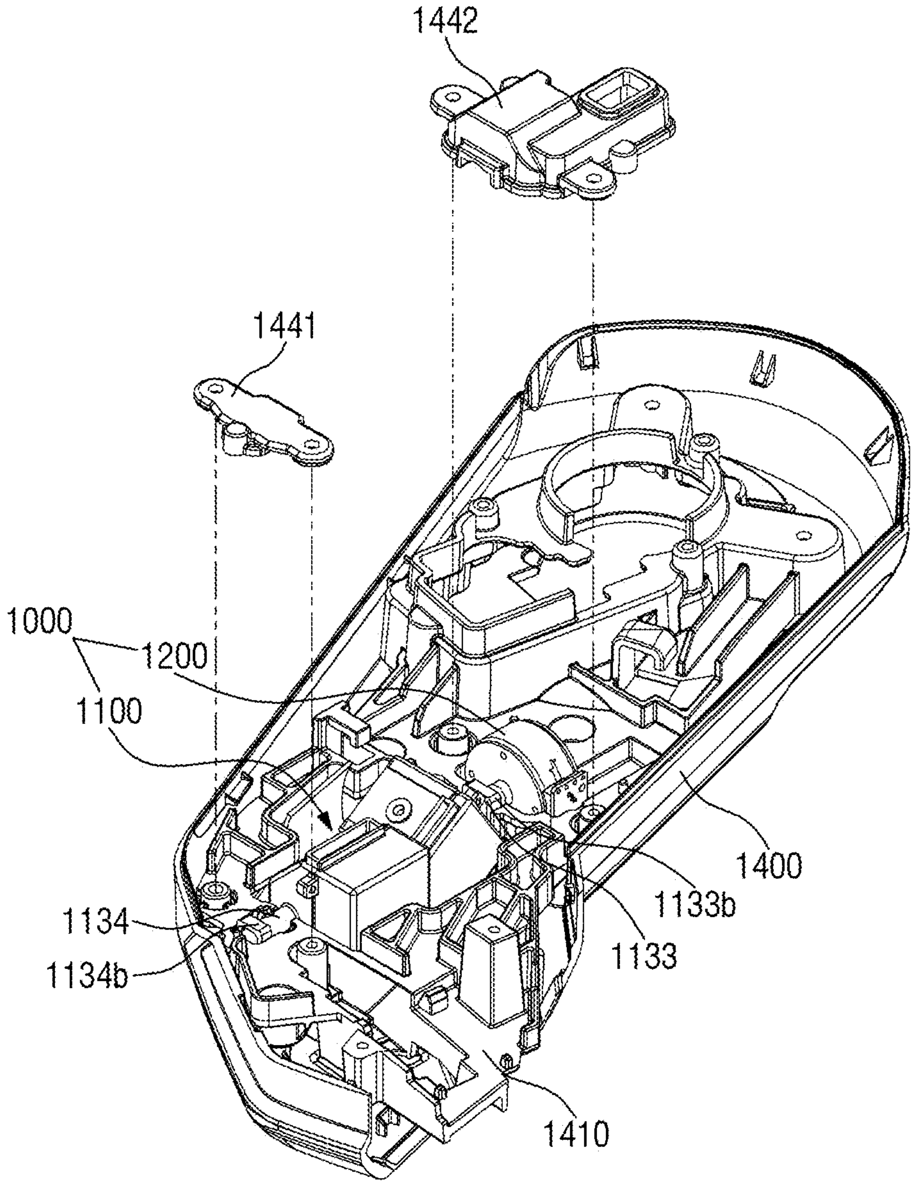
FIG. 25 is an exploded perspective view illustrating a fixing member according to an embodiment of the present disclosure.
Figure 26:
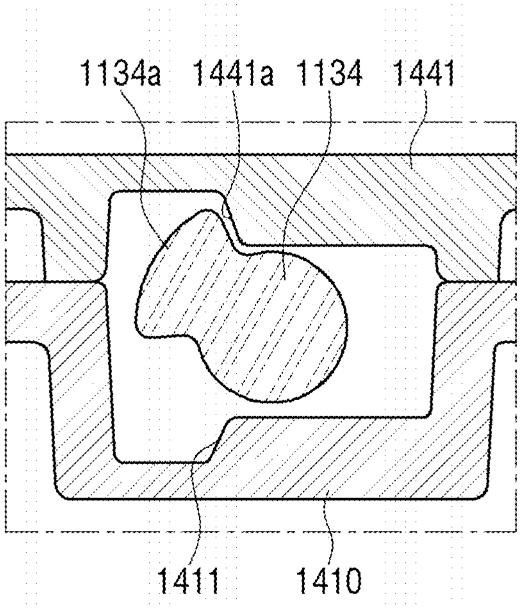
FIG. 26 is a side view illustrating the fixing member according to an embodiment of the present disclosure.

FIG. 25 is an exploded perspective view illustrating a fixing member according to an embodiment of the present disclosure, and FIG. 26 is a side view illustrating the fixing member according to an embodiment of the present disclosure.

Referring to FIGS. 25 and 26, the mounting frame 1410 and fixing members 1441 and 1442 according to an embodiment of the present disclosure may form a closed curve such that respective portions of the coupling shaft 1133 and the rotation shaft 1134 are encompassed between the mounting frame 1410 and the fixing members 1441 and 1442. Accordingly, the coupling shaft 1133 and the rotation shaft 1134 may be maintained at correct positions.

In this case, catching jaws 1411 and 1441*a* may be formed in the mounting frame 1410 and at least one of the fixing members 1441 and 1442, respectively. A catching projection 1134*a* may be formed in at least one of the coupling shaft 1133 or the rotation shaft 1134 to limit the rotation range of the light irradiation unit 1100.

For example, when the lighting device 1000 according to the present disclosure is initially driven, the light irradiation unit 1100 may be rotated by the driving unit 1200 until the catching projection 1134*a* of the rotation shaft 1134 abuts the catching protrusion 1411 or 1441*a* of any one of the mounting frame 1410 or the fixing member 1441, and accordingly, the location where the pattern image is to be projected may be adjusted using the location where the catching projection 1134*a* of the rotation shaft 1134 abuts the catching protrusion 1411 or 1441*a* of any one of the mounting frame 1410 or the fixing member 1441 as the reference.

In this case, the rotation shaft 1134 and the fixing member 1441 allowing the rotation shaft 1134 to be maintained at the regular location have been described by way of example in FIG. 26, but the description of FIG. 26 may be similarly applied to the coupling shaft 1133 and the fixing member 1442 allowing the coupling shaft 1133 to be maintained at the regular location.

Meanwhile, the coupling shaft 1133 and the rotation shaft 1134 may be respectively provided with bushing members 1133*b* and 1134*b* made of a POM material having excellent mechanical strength, wear resistance, oil resistance, and the like, such as polyacetal or polyoxymethylene, so as to ensure durability while enabling smooth rotation.

Figure 27:
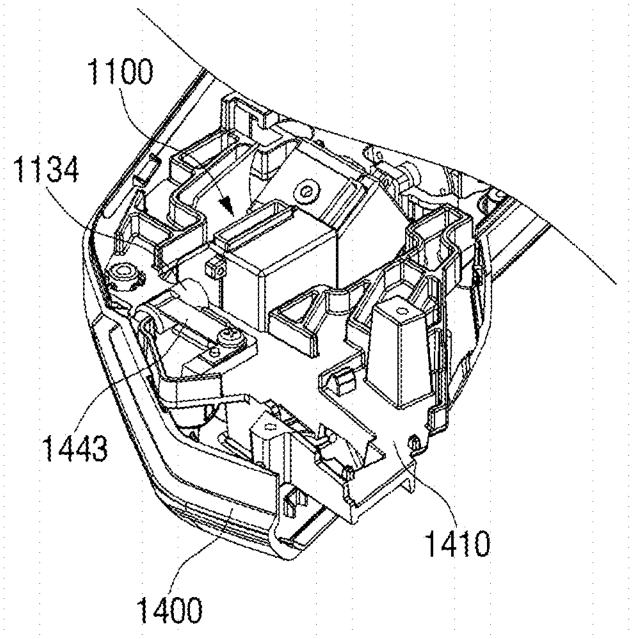
FIG. 27 is a perspective view illustrating a fixing member according to another embodiment of the present disclosure.
Figure 28:
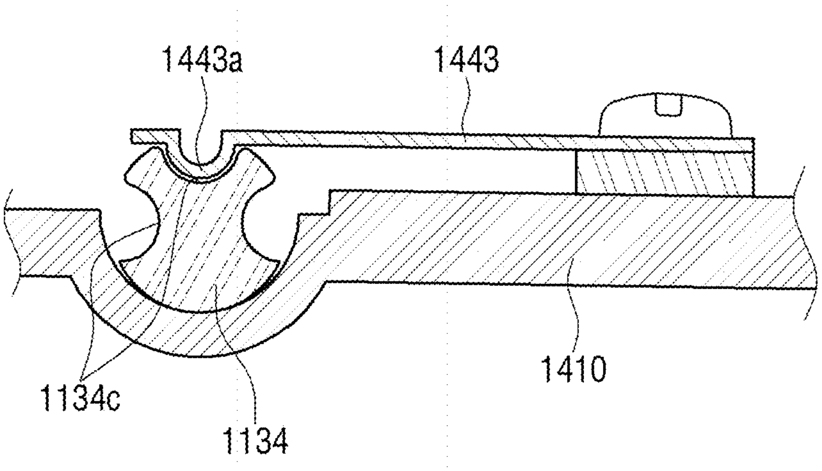
FIG. 28 is a side view illustrating the fixing member according to another embodiment of the present disclosure.

FIG. 27 is a perspective view illustrating a fixing member according to another embodiment of the present disclosure, and FIG. 28 is a side view illustrating the fixing member according to another embodiment of the present disclosure.

Referring to FIGS. 27 and 28, a fixing member 1443 according to another embodiment of the present disclosure may be configured so that one end thereof is fixed to the mounting frame 1410 and the other end thereof is configured to apply pressure to the rotation shaft 1134.

In the another embodiment of the present disclosure, a case where the fixing member 1443 is formed of an elastic member such as a leaf spring that may be elastically deformed when external force is applied thereto and restored to its original shape when the external force is removed will be described by way of example.

In this case, in the another embodiment of the present disclosure, a protrusion portion 1443*a* may be formed at the other end of the fixed member 1443 so as to protrude toward the rotation shaft 1134. The protrusion portion 1443*a* may be configured to be inserted into one of a plurality of insertion groves 1134*c* formed in the rotation shaft 1134 along the rotation direction of the rotation shaft 1134. Such a configuration may allow the light irradiation unit 1100 to be rotated to predetermined angles when the light irradiation unit 1100 is rotated.

Figure 29:
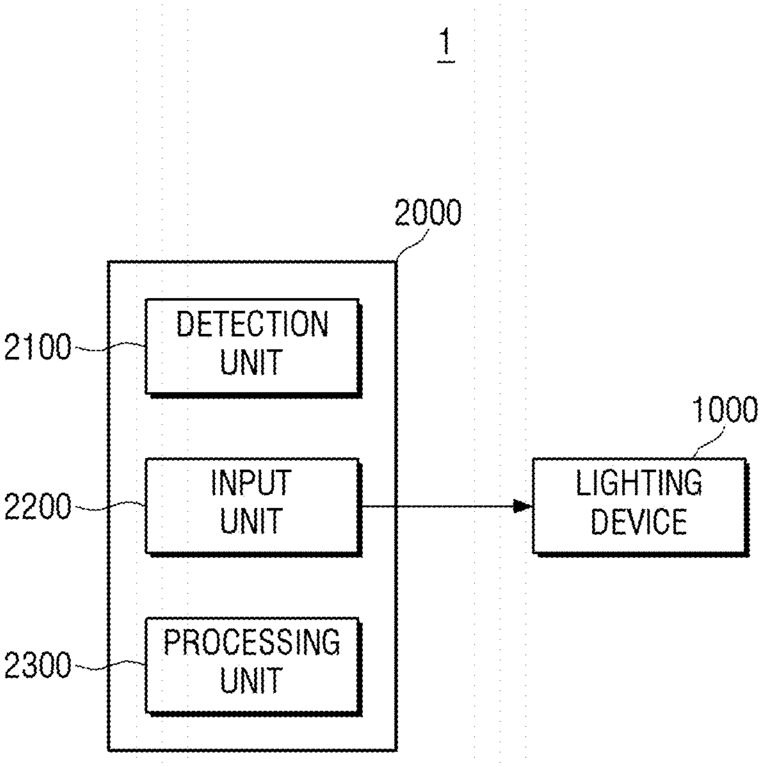
FIG. 29 is a block diagram illustrating a lighting system according to an embodiment of the present disclosure.
Figure 30:
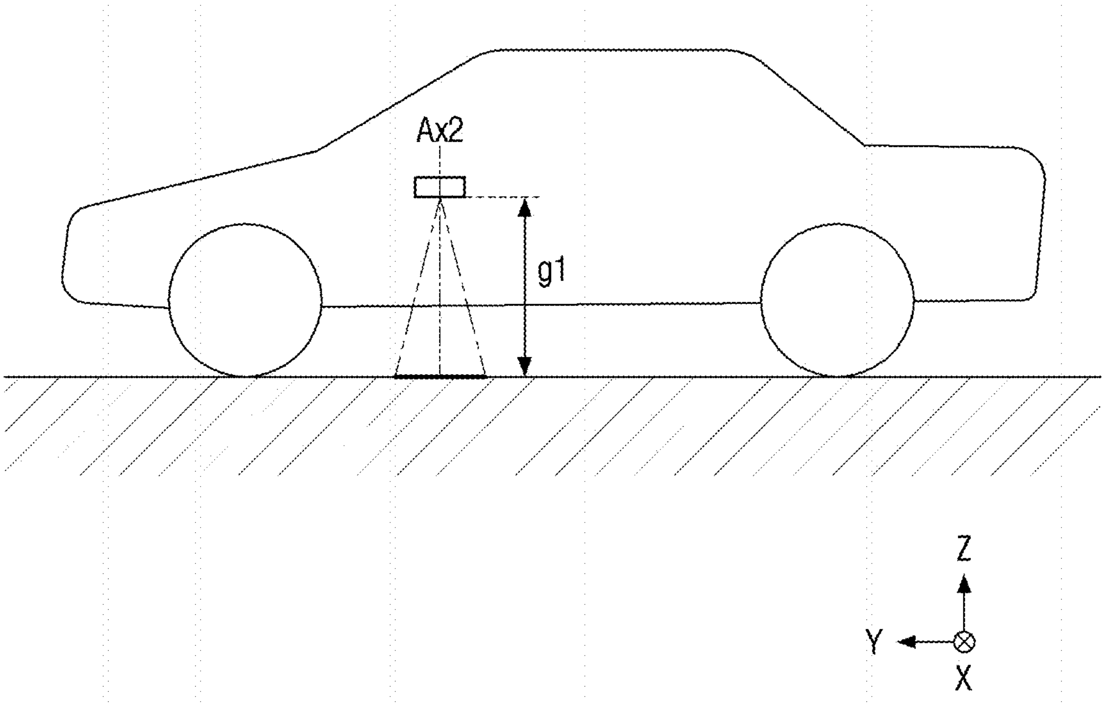
FIG. 30 is a schematic view illustrating a light reaching distance from the lighting device according to an embodiment of the present disclosure.
Figure 31:
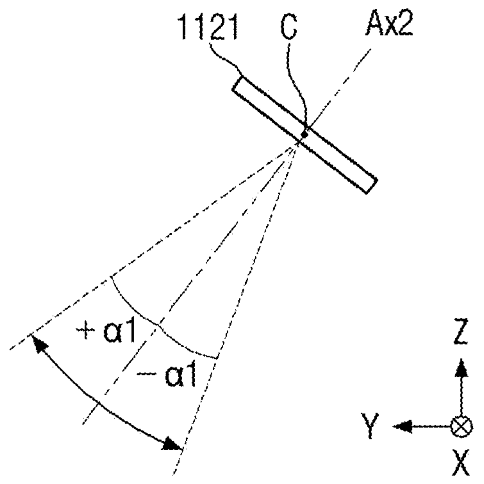
FIG. 31 is a schematic view illustrating a tilting angle of the reflective surface corresponding to the light reaching distance of FIG. 30.
Figure 32:
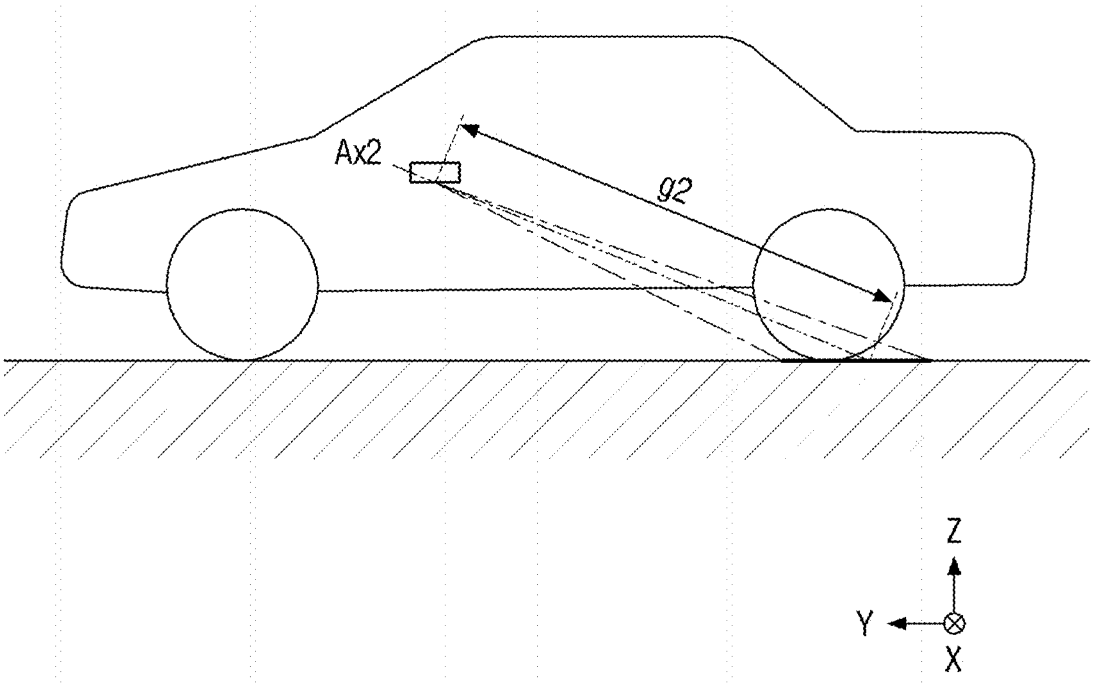
FIG. 32 is a schematic view illustrating a light reaching distance from a lighting device according to another embodiment of the present disclosure.
Figure 33:
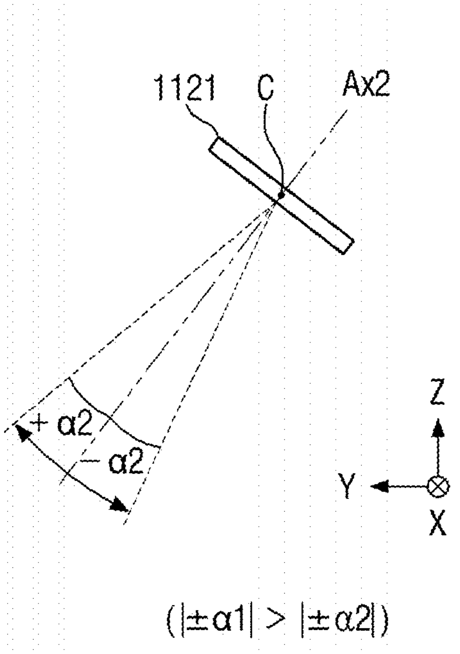
FIG. 33 is a schematic view illustrating a tilting angle of the reflective surface corresponding to the light reaching distance of FIG. 32.

FIG. 29 is a block diagram illustrating a lighting system according to an embodiment of the present disclosure.

Referring to FIG. 29, a lighting system 1 according to an embodiment of the present disclosure may include a lighting device 1000 and a control device 2000. The lighting device 1000 in the lighting system 1 according to the present disclosure may be the lighting device described above. The components that play the same roles will be denoted by the same reference numerals, and a detailed description thereof will be omitted.

The control device 2000 may include a detection unit 2100, an input unit 2200, and a processing unit 2300.

The detection unit 2100 may include at least one detection sensor that detects the state of the vehicle or the state of the surroundings of the vehicle.

In this case, the vehicle state may include a vehicle speed, a shift stage, a driving direction, a door open/closed state, and the like, and the state of the surroundings may include a road surface state, a weather state, surrounding brightness, and the like.

In addition, the detection unit 2100 may be configured to detect a location where the pattern image has been previously formed by the lighting device 1000, attributes of the pattern image, or the like, which is to allow a pattern image having the same attribute to be formed even when the location of the pattern image changes. For example, a pattern image having the same brightness and/or size may be be formed even though the location of the pattern image changes.

The input unit 2200 may be configured to receive a detection result from the detection unit 2100, a control command from a driver, or the like, and the processing unit 2300 may be configured to generate a control signal so as to form a corresponding road surface image according to information input to the input unit 2200 and may be configured to output the generated control signal to the lighting device 1000.

The control command from the driver may include information associated with the location of the pattern image as selected by the driver, the attribute of the pattern image, or the like.

The processing unit 2300 may be configured to cause a pattern image having a set attribute to be formed at a set location according to the information input to the input unit 2200. For example, the processing unit 2300 may be configured to output a control signal if the vehicle stops or slows down below a reference speed and a door is opened so as to form a pattern image on a road surface around the vehicle so that other road users in the vicinity of the vehicle may be cautioned about disembarkation of a passenger in advance and be prepared. The processing unit 2300 may be configured to output a control signal if the driver or passenger is about to embark the vehicle so as to form a pattern image for welcoming the driver or passenger in the vicinity of a side of the vehicle.

In addition, if the surrounding becomes brighter or the weather conditions deteriorate, the processing unit 2300 may be configured to prevent the visibility of the pattern images from being reduced by, for example, increasing the light output of the light source unit 1100.

The pattern image formed by the lighting system 1 according to the present disclosure is not limited to the above-described example. Any pattern image that indicates various information deemed necessary for the passenger, the surrounding vehicle, or the pedestrian may be formed, and a location or an attribute of the pattern image may be variously changed based on at least one of the vehicle state or the vehicle surrounding state.

Meanwhile, the processing unit 2300 may be configured to allow pattern images formed at different locations to have a consistent size by adjusting the tilting angle of the at least one reflective surface 1121 around the rotation axis C with respect to the second main axis Ax2, depending on the location of the light irradiation unit 1100, to make the light irradiation angles of the lighting device 1000 different for the pattern images at different locations with respect to the vehicle.

In other words, when the angle at which at least one reflective surface 1121 is repeatedly tilted in at least one direction (e.g., an oscillation angle or an oscillation range) with respect to the second main axis Ax2 is constant, the pattern images may be formed in different sizes depending on the distance from the lighting device 1 according to the present disclosure. If the size or the attribute of the pattern image changes, there is a possibility that the surrounding vehicle or the pedestrian may mistake the information.

Accordingly, in an embodiment of the present disclosure, by decreasing the oscillation angle by which at least one reflective surface 1121 repeatedly swings with respect to the second main axis Ax2 or by decreasing the resultant light irradiation angle of the at least one reflective surface 1121 for the light that is to reach a farther distance from the lighting device 1000 according to the present disclosure, the pattern images having a more uniform size may be formed even though the locations of the pattern images differ, and therefore, the visibility may be improved.

For example, as illustrated in FIGS. 30 to 33, when light is emitted nearly perpendicularly to the road surface from the lighting device 1000, the distance that the light reaches the road surface from the lighting device 1000 is g1, and in this state, at least one reflective surface 1121 may be repeatedly tilted between the angles of $+\alpha 1$ and $-\alpha 2$ with respect to the second main axis Ax2 around the rotation axis C so that a pattern image having a predetermined attribute is formed. On the other hand, when the distance that the light reaches the road surface increases from g1 to g2 (g2 being greater than g1) due to the rotation of the light irradiation unit 110, at least one reflective surface 1121 may be tilted between the angles of +α2 and −α2, which is smaller than +α1 and −α1 in terms of the magnitude, with respect to the second main axis Ax2 around the rotation axis C so that the pattern image having the predetermined attribute is formed. Accordingly, although the distance from the lighting device 1000 to the pattern images formed on the road surface changes, the pattern images may be formed to have substantially consistent attributes.

Herein, as described above, the light path adjustment unit 1120 may include a plurality of reflective surfaces 1121 (e.g., an array of micro mirrors). The plurality of reflective surfaces 1121 may be collectively controlled to be repeatedly tilted by a predetermined frequency or may be individually controlled to adjust the resultant light irradiation angle of the beam reflected therefrom.

In this case, FIGS. 30 to 33 are an example of a case where at least one reflective surface 1121 is tilted in the forward and backward direction with respect to the second main axis Ax2.

It may be understood that when at least one reflective surface 1121 is tilted at the angles of +α1 and −α1 with respect to the second main axis Ax2, the light irradiation angle of the lighting device 1000 becomes 2×α1, and when at least one reflective surface 1121 is tilted at the angles of +α2 and −α2 with respect to the second main axis Ax2, the light irradiation angle of the lighting device 1000 becomes 2×α2.

In addition, when the distance that the light reaches the road surface from the lighting device 1000 increases from g1 to g2, the light is diffused more, such that the brightness of the pattern image may be decreased. Therefore, the light amount of the light source unit 1110 may be increased by increasing the current applied to the light source unit 1110.

In other words, in an embodiment of the present disclosure, the lighting system 1 may form pattern images having a more uniform attribute even though the location where the pattern image is projected changes, by adjusting the light amount of the light source unit 1110 and/or the tilting angle of at least one reflective surface 1121, according to the location to which the light is emitted from the lighting device 1000 on the road surface around the vehicle.

In addition, in the lighting system 1 according to an embodiment of the present disclosure, a case where at least one reflective surface 1121 is alternately and repeatedly tilted to an equal angle in both directions with respect to the second main axis Ax2 has been described by way of example. However, the present disclosure is not limited thereto, and at least one reflective surface 1121 may be repeatedly tilted only in one direction with respect to the second main axis Ax2 or may be tilted in both directions to different angles.

For example, even though at least one reflective surface 1121 is tilted to the same angle on both sides with respect to the second main axis Ax2, when the vehicle is driven on a slope, the light irradiation ranges may become different for the two sides with respect to the second main axis Ax2, and thus, at least one reflective surface 1121 may be repeatedly tilted to different angles in both directions with respect to the second main axis Ax2.

Herein, although exemplary embodiments are described as using a plurality of units (e.g., the detection unit 2100, the input unit 2200, and the processing unit 2300) to perform the exemplary processes, it is to be understood that the exemplary processes may also be performed by one or plurality of modules (e.g., computer-implemented modules). Additionally, it is to be understood that the terms controller/control unit and processing unit refer to a hardware device that includes a memory and a processor. The memory is configured to store the modules, and the processor is specifically configured to execute said modules to perform one or more processes which are described herein.

One of ordinary skill in the art to which the present disclosure pertains will appreciate that the present disclosure may be implemented in other specific forms without departing from the technical spirit or essential feature of the present disclosure. Therefore, it is to be understood that the embodiments described above are illustrative rather than being restrictive in any aspects. The scope of the present disclosure will be defined by the claims rather than the description described above, and all modifications and alterations derived from the claims and their equivalents are to be interpreted as falling within the scope of the present disclosure.

What is claimed is:

1. A lighting system for a vehicle comprising:

a lighting device that emits light for forming a pattern image to at least one location; and a control device configured to control a target direction to which the light is emitted based on vehicle state information, wherein the lighting device comprises:

a light source unit that generates irradiation light; and a light path adjustment unit that adjusts a light path to allow the generated irradiation light to proceed in the target direction, wherein the light path adjustment unit includes at least one reflective surface that reflects the irradiation light to allow the generated irradiation light to proceed in the target direction, wherein the at least one reflective surface is configured to be tilted with respect to a main axis of the light path adjustment unit, wherein the main axis of the light path adjustment unit is configured to be tilted with respect to a main axis of the light source unit, thereby allowing the target direction to be determined according to a tilting angle of the main axis of the light path adjustment unit with respect to the main axis of the light source unit, and wherein the vehicle state information includes at least one of vehicle speed, shift stage, driving direction, or door opening state.

2. A lighting system for a vehicle comprising:

a lighting device that emits light for forming a pattern image to at least one location; and a control device configured to control a target direction to which the light is emitted based on vehicle surrounding information, wherein the lighting device comprises:

a light source unit that generates irradiation light; and a light path adjustment unit that adjusts a light path to allow the generated irradiation light to proceed in the target direction, wherein the light path adjustment unit includes at least one reflective surface that reflects the irradiation light to allow the generated irradiation light to proceed in the target direction, wherein the at least one reflective surface is configured to be tilted with respect to a main axis of the light path adjustment unit, wherein the main axis of the light path adjustment unit is configured to be tilted with respect to a main axis of the light source unit, thereby allowing the target direction to be determined according to a tilting angle of the main axis of the light path adjustment unit with respect to the main axis of the light source unit, and wherein the vehicle surrounding information includes at least one of surrounding brightness, road surface state, or weather condition.

3. A lighting system for a vehicle comprising:

a lighting device that emits light for forming a pattern image to at least one location; and a control device configured to control a target direction to which the light is emitted based on at least one of vehicle state information or vehicle surrounding information, wherein the lighting device comprises:

a light source unit that generates irradiation light; and a light path adjustment unit that adjusts a light path to allow the generated irradiation light to proceed in the target direction, wherein the light path adjustment unit includes at least one reflective surface that reflects the irradiation light to allow the generated irradiation light to proceed in the target direction, wherein the at least one reflective surface is configured to be tilted with respect to a main axis of the light path adjustment unit, and wherein the main axis of the light path adjustment unit is configured to be tilted with respect to a main axis of the light source unit, thereby allowing the target direction to be determined according to a tilting angle of the main axis of the light path adjustment unit with respect to the main axis of the light source unit.

4. The lighting system of claim 3, wherein the at least one reflective surface is tilted with respect to the main axis of the light path adjustment unit to allow the pattern image to have a predetermined size, and wherein the control device is configured to control a light irradiation angle of the irradiation light by adjusting an angle to which the at least one reflective surface is tilted with respect to the main axis of the light path adjustment unit.

5. The lighting system of claim 4, wherein the at least one reflective surface is tilted repeatedly with a predetermined frequency with respect to the main axis of the light path adjustment unit to allow the pattern image to have the predetermined size.

6. The lighting system of claim 4, wherein the control device is configured to adjust at least one of a light amount or the light irradiation angle of the generated irradiation light depending on a location to which the light is to be emitted by the light path adjustment unit.

7. The lighting system of claim 4, wherein the control device is configured to allow pattern images that are formed at locations having different distances from the lighting device to have a substantially uniform brightness and size by adjusting at least one of the light amount or the light irradiation angle of the generated irradiation light depending on the distances that the irradiation light emitted from the lighting device reaches.

8. The lighting system of claim 4, wherein the control device is configured to decrease the light irradiation angle and/or increase the light amount of the light source unit as the distance for the irradiation light emitted from the lighting device to reach increases.

9. The lighting system of claim 3, wherein the control device comprises:

a detection unit configured to detect at least one of the vehicle state information or the vehicle surrounding information;

an input unit to which a detection result by the detection unit is input; and a processing unit configured to control at least one of the target direction or one or more attributes of the pattern image based on the detection result input from the detection unit.

10. The lighting system of claim 9, wherein the processing unit is configured to control the one or more attributes of the pattern image based on the detection result input from the detection unit, and wherein the one or more attributes of the pattern image include at least one of size, brightness, or color of the pattern image.

11. The lighting system of claim 9, wherein the input unit is configured to receive a control command from a driver associated with at least one of the target direction or the attributes of the pattern image.

12. The lighting system of claim 3, wherein the control device is configured to allow the pattern image to be formed in response to the vehicle being at rest or coming to rest.

* * * * *